United States Patent
Yang et al.

(10) Patent No.: US 12,530,165 B2
(45) Date of Patent: Jan. 20, 2026

(54) ONLINE MEETING INTERFACE DISPLAY METHOD AND APPARATUS, MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Leixin Yang, Shenzhen (CN); Heng Yang, Shenzhen (CN); Xiufeng Zhu, Shenzhen (CN); Wanpeng Luo, Shenzhen (CN); Jianfeng Ye, Shenzhen (CN); Zihao Wang, Shenzhen (CN); Weiyi Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 229 days.

(21) Appl. No.: 18/451,425

(22) Filed: Aug. 17, 2023

(65) Prior Publication Data

US 2023/0393800 A1 Dec. 7, 2023

Related U.S. Application Data

(63) Continuation of application No. PCT/CN2022/134693, filed on Nov. 28, 2022.

(30) Foreign Application Priority Data

Mar. 1, 2022 (CN) .......................... 202210194408.1

(51) Int. Cl.
*G06F 3/14* (2006.01)
*H04L 65/403* (2022.01)

(52) U.S. Cl.
CPC .......... *G06F 3/1454* (2013.01); *H04L 65/403* (2013.01)

(58) Field of Classification Search
CPC .. G06F 3/0488; G06F 3/1454; G06F 3/04817; G06F 3/1446; G06F 16/53;
(Continued)

(56) References Cited

U.S. PATENT DOCUMENTS 5,812,125 A * 9/1998 Wilkinson ............... H04N 7/15
348/E7.083
8,830,293 B2 * 9/2014 Mauchly ................ H04N 7/147
348/14.07
(Continued)

FOREIGN PATENT DOCUMENTS

| CN | 104349111 A | 2/2015 |
| CN | 107426524 A | 12/2017 |

(Continued)

OTHER PUBLICATIONS

The World Intellectual Property Organization (WIPO) International Search Report for PCT/CN2022/134693 Feb. 20, 2023 5 Pages (including translation).

*Primary Examiner* — Gerald Gauthier
(74) *Attorney, Agent, or Firm* — Anova Law Group, PLLC

(57) ABSTRACT

Disclosed are an online meeting interface method and apparatus, a medium, and a computer program product, which relate to the technical field of online meetings. The method includes obtaining a frame background image of the online meeting in a same-frame mode; generating a same-frame picture based on the frame background image and video pictures of participants, the video pictures of different participants being displayed at different positions of the frame background image; and pushing the same-frame picture to clients of the participants. The clients may display the same-frame picture in the online meeting interface.

20 Claims, 14 Drawing Sheets

(58) Field of Classification Search
CPC . G06T 7/174; G06T 7/90; G06T 11/00; G06T 7/12; G06T 7/194; H04L 12/1831; H04L 65/403; H04L 12/1822; H04N 5/262; H04N 5/2624; H04N 5/2628; H04N 5/268; H04N 7/142; H04N 7/147; H04N 7/15; H04N 7/152; H04N 13/257; H04N 19/105; H04N 19/21; H04N 21/422; H04N 21/4314; H04N 21/4316; H04N 21/4788; H04N 21/8153; H04N 19/172; H04N 21/6587; H04N 21/812; G06V 40/174
See application file for complete search history.

(56) References Cited

U.S. PATENT DOCUMENTS

| | | | | |
|---|---|---|---|---|
| 9,013,536 B2 * | 4/2015 | Zhu | ........................ | H04N 19/21 |
| | | | | 348/14.02 |
| 10,235,788 B2 * | 3/2019 | Tinsman | ................ | G06T 11/00 |
| 11,310,441 B2 * | 4/2022 | Lee | ..................... | H04N 21/422 |
| 11,601,618 B1 * | 3/2023 | Slotznick | ............... | H04N 7/147 |
| 11,659,138 B1 * | 5/2023 | Segal | ................... | H04N 21/812 |
| | | | | 348/14.08 |
| 11,736,661 B2 * | 8/2023 | Gandhi | ................. | G06F 3/1454 |
| | | | | 348/204 |
| 11,743,417 B2 * | 8/2023 | Springer | ............ | H04N 21/6587 |
| | | | | 348/14.07 |
| 11,800,060 B1 * | 10/2023 | Libin | ................... | G06V 40/174 |
| 2006/0268101 A1 * | 11/2006 | He | ........................ | H04N 7/147 |
| | | | | 348/14.07 |
| 2007/0285500 A1 * | 12/2007 | Ma | ..................... | H04N 19/105 |
| | | | | 375/E7.149 |
| 2009/0033737 A1 * | 2/2009 | Goose | ..................... | H04N 7/15 |
| | | | | 348/E7.083 |
| 2009/0210789 A1 * | 8/2009 | Thakkar | ............. | H04N 21/4788 |
| | | | | 715/753 |
| 2010/0302130 A1 * | 12/2010 | Kikuchi | ............. | H04N 21/4316 |
| | | | | 345/1.3 |
| 2011/0276902 A1 | 11/2011 | Li | | |
| 2012/0127259 A1 * | 5/2012 | Mackie | ................. | H04N 7/142 |
| | | | | 348/E7.083 |
| 2012/0140020 A1 * | 6/2012 | Rosenberg | ............. | H04N 7/147 |
| | | | | 348/E7.083 |
| 2012/0162349 A1 * | 6/2012 | Alexandrov | ........ | H04L 12/1831 |
| | | | | 348/E7.083 |
| 2012/0188243 A1 * | 7/2012 | Fujii | ..................... | G06F 3/0488 |
| | | | | 345/426 |
| 2013/0321586 A1 * | 12/2013 | Kirk | ..................... | H04N 13/257 |
| | | | | 348/47 |
| 2014/0362163 A1 * | 12/2014 | Winterstein | ............. | H04N 7/15 |
| | | | | 348/14.07 |
| 2015/0089394 A1 | 3/2015 | Chen et al. | | |
| 2015/0103131 A1 * | 4/2015 | Denoue | .................... | H04N 7/15 |
| | | | | 348/14.03 |
| 2015/0277842 A1 * | 10/2015 | Huang | .................. | G06F 3/1446 |
| | | | | 348/14.07 |
| 2015/0288933 A1 * | 10/2015 | Iversen | .................... | G06T 7/174 |
| | | | | 348/14.07 |
| 2015/0301625 A1 * | 10/2015 | Suzuki | .................. | H04N 7/147 |
| | | | | 345/157 |
| 2017/0237941 A1 * | 8/2017 | Vats | ..................... | H04N 5/2628 |
| | | | | 348/14.07 |
| 2021/0152778 A1 * | 5/2021 | Daggubati | ............ | H04N 7/147 |
| 2022/0232189 A1 * | 7/2022 | Swierk | ...................... | G06T 7/90 |
| 2023/0164298 A1 * | 5/2023 | Khot | ........................ | H04N 7/15 |
| | | | | 348/14.08 |
| 2023/0179742 A1 * | 6/2023 | Doken | ..................... | H04N 7/15 |
| | | | | 348/14.08 |
| 2023/0247069 A1 * | 8/2023 | Khire | ..................... | H04N 19/172 |
| | | | | 348/14.08 |
| 2023/0276018 A1 * | 8/2023 | Han | ...................... | H04N 7/152 |
| | | | | 348/14.07 |
| 2023/0291776 A1 * | 9/2023 | Ayanoglu | ............ | G06F 3/04817 |
| 2023/0316533 A1 * | 10/2023 | Springer | ................. | G06F 16/53 |
| | | | | 382/173 |
| 2023/0316534 A1 * | 10/2023 | Springer | ................. | G06T 7/194 |
| 2023/0319221 A1 * | 10/2023 | Doken | ..................... | G06T 7/12 |
| 2023/0393800 A1 * | 12/2023 | Yang | ........................ | H04N 7/15 |
| 2024/0154831 A1 * | 5/2024 | Carluccio | ........... | H04L 12/1822 |

FOREIGN PATENT DOCUMENTS

| | | |
|---|---|---|
| CN | 107613242 A | 1/2018 |
| CN | 111596985 A | 8/2020 |
| JP | 2011239397 A | 11/2011 |
| JP | 2013533987 A | 8/2013 |
| JP | 6888854 B1 | 6/2021 |

\* cited by examiner

ONLINE MEETING INTERFACE DISPLAY METHOD AND APPARATUS, MEDIUM, AND COMPUTER PROGRAM PRODUCT

RELATED APPLICATIONS

This application is a continuation of PCT Application No. PCT/CN2022/134693, filed on Nov. 28, 2022, which in turn claims priority to Chinese Patent Application No. 202210194408.1, entitled "ONLINE MEETING INTERFACE DISPLAY METHOD AND APPARATUS, MEDIUM, AND COMPUTER PROGRAM PRODUCT" filed on Mar. 1, 2022. The two applications are both incorporated by reference in their entirety.

FIELD OF THE TECHNOLOGY

Embodiments of this application relate to the technical field of online meetings, and in particular, to an online meeting interface display method and apparatus, a medium, and a computer program product.

BACKGROUND OF THE DISCLOSURE

With the continuous development of network and streaming media technology, online meetings have emerged. In contrast to traditional meetings, a participant may join an online meeting at any location via a terminal without having to reach a specified meeting venue in advance.

After the participant requests to join the online meeting by inputting a meeting number and enables video access, different participants having enabled video access may be displayed in an online meeting interface in grid mode.

In online meeting interface displays, a video picture corresponding to each participant is displayed independently, a meeting creator or a meeting host needs to manually adjust the display position of a video picture corresponding to each participant. Such manual adjustment is inefficient.

SUMMARY

Embodiments of this application provide an online meeting interface method and apparatus, a medium, and a computer program product. The technical solutions are as follows:

One aspect of this embodiment provides an online meeting interface display method. The method is performed by a server. The method includes obtaining a frame background image of the online meeting in a same-frame mode; generating a same-frame picture based on the frame background image and video pictures of participants, the video pictures of different participants being displayed at different positions of the frame background image; and pushing the same-frame picture to clients of the participants.

Another aspect of this embodiment provides an online meeting interface display method. The method is performed by a terminal. The method includes receiving a meeting joining operation, the meeting joining operation triggering joining an online meeting; displaying a same-frame picture in an online meeting interface in response to that the online meeting enables same-frame mode, video pictures of different participants in the same-frame picture being displayed at different positions of a same frame background image; and displaying the video picture of the current participant at a picture position of the frame background image in the same-frame picture in response to that video access is enabled.

Another aspect of this embodiment provides a non-transitory computer-readable storage medium. The readable storage medium stores at least one instruction. The at least one instruction is loaded and executed by one or more processors to implement the online meeting interface display method in the foregoing aspect.

Embodiments of this application provide same-frame mode in an online meeting scene, whereby after a client enables the same-frame mode, video pictures corresponding to participants may be displayed at different positions in a same frame background image, and the frame background image corresponds to a current online meeting. Specific position requirements in different online meeting scenes can be satisfied, and there is no need for the participants to actively adjust display positions of the video pictures corresponding to the participants in an online meeting interface, thereby improving the efficiency of adjusting display requirements of specific positions of the video pictures in the online meeting scene.

DESCRIPTION OF EMBODIMENTS

Figure 1:
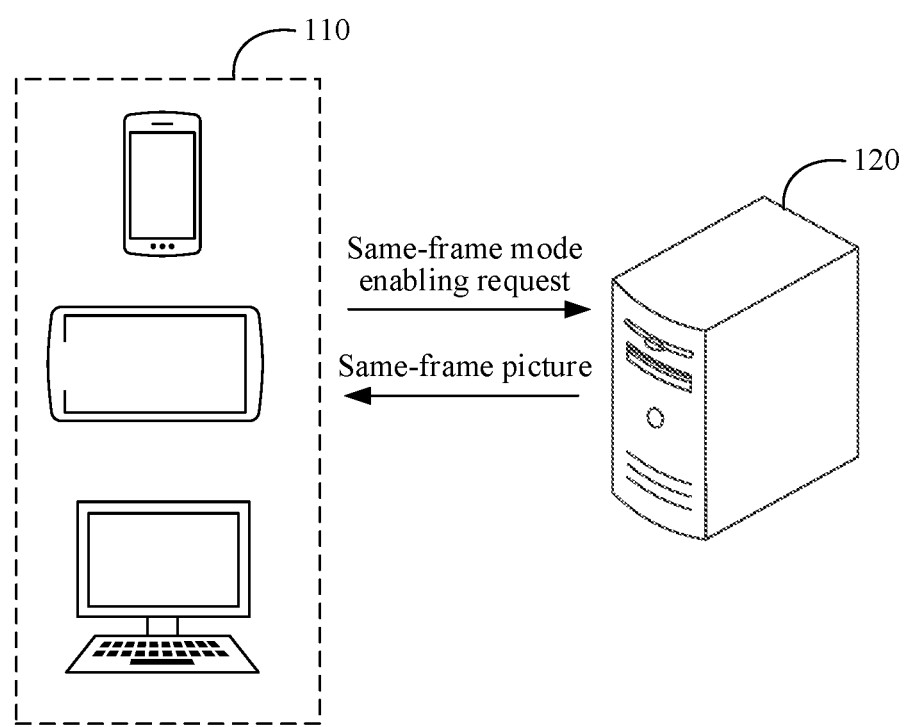
FIG. 1 shows a system architecture diagram of an online meeting system according to an embodiment of this application.

FIG. 1 shows a system architecture diagram of an online meeting system according to an embodiment of this application. The online meeting system includes a terminal 110 and a server 120. The terminal 110 and the server 120 communicate data through a communication network. In some embodiments, the communication network may be a wired network or a wireless network, and the communication network may be at least one of a local area network, a metropolitan area network, and a wide area network.

The terminal 110 is an electronic device running a meeting client. The meeting client may be a desktop client or a webpage client. The electronic device may be a smartphone, a tablet computer, a personal computer, a wearable device, or a vehicle-mounted terminal. In FIG. 1, terminal 110 includes, but is not limited to, a smartphone, a tablet computer, and a personal computer.

The server 120 may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. In this embodiment, server 120 may be a background server for a conferencing application.

In some embodiments, services implementing different functions are deployed in the server 120, and different services may be deployed on the same server or different servers. In one possible implementation, a meeting layout service, same-frame mode service, a meeting control service, etc. are deployed in the server 120 in order to implement a warm-up function.

The main function of the meeting layout service is to manage the layout, background image, and meeting layout template, etc. in a meeting. When a user enters the meeting, the meeting layout service manages the query and setting of the same frame layout, etc., and also plays the role of notifying the meeting control service, the same-frame mode service, and clients.

The same-frame mode service is used for controlling same-frame mode robot to enter the meeting after same-frame mode is enabled, whereby a plurality of video user pictures are cut and combined into a new picture function, and user video stream data will be detected and processed.

The main function of the meeting control service is to manage the meeting, the user entering and exiting the meeting, a user status, notification of changes to layout-related data. If the same-frame layout is enabled during the meeting, the meeting layout service will notify the meeting control service to notify clients of participants of the information.

In this embodiment, after enabling the same-frame mode, terminal 110 transmits same-frame mode enabling request to the server 120, and the server 120 pushes a generated same-frame picture to the terminals 110 correspondingly.

The various embodiments described below describe an example where display of an online meeting interface is applied to the online meeting system shown in FIG. 1.

Figure 2:
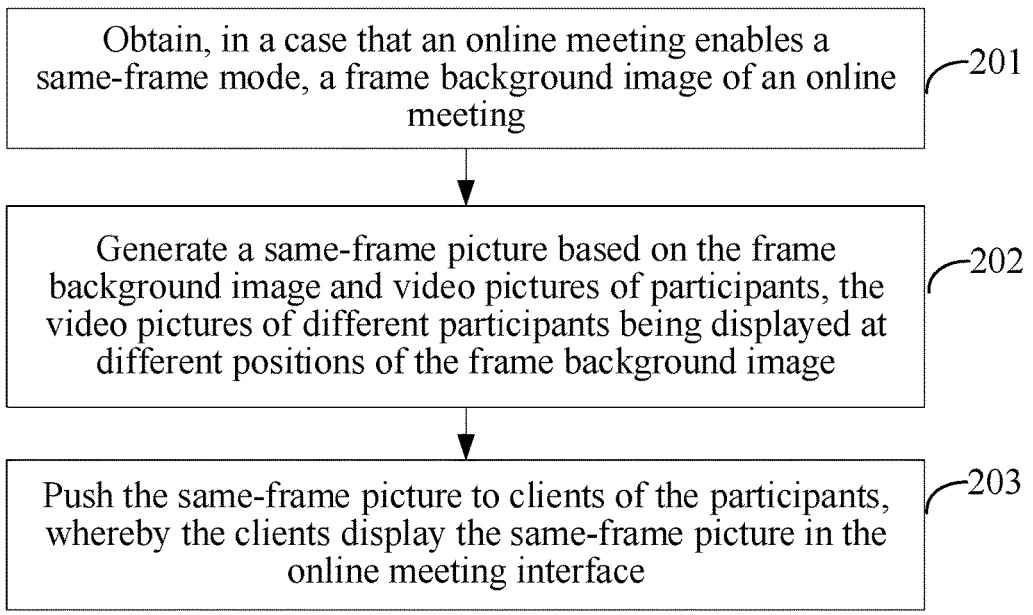
FIG. 2 shows a flowchart of an online meeting interface display method according to an embodiment of this application.

FIG. 2 shows a flowchart of an online meeting interface display method according to an embodiment of this application. This embodiment describes an example where the method is applied to the server in the online meeting system shown in FIG. 1. The method includes the following steps:

Step 201: Obtain, in response to that an online meeting enables same-frame mode, a frame background image of the online meeting.

The frame background image is used for integrating picture layouts of video pictures corresponding to different participants, and different online meeting scenes may correspond to different frame background images. That is to say, the video pictures of the participants may be integrated into the same meeting scene using the frame background image. In order to put the frame background image into the video pictures of different participants, at least a plurality of seats are arranged in the frame background image to render the video pictures of different participants at different seats. For example, the frame background image is a frame background image under a classroom scene. The frame background image contains several classroom seats, whereby video pictures corresponding to different participants may be rendered at different classroom seats during an online meeting process. Then different participants may all coexist under the same classroom scene, to achieve the effect of conducting a real meeting under the classroom scene.

In an online meeting scene, each participant may select whether to enable same-frame mode. When the participant determines to enable the same-frame mode, a corresponding server receives a request for enabling the same-frame mode for the online meeting, the same-frame mode is enabled, and the step of subsequently generating a same-frame picture is performed. If the participant does not enable the same-frame mode, the corresponding server will not perform the subsequent step of generating the same-frame picture.

In some embodiments, in the online meeting, when there is a certain participant enabling the same-frame mode, an online meeting interface of the participant correspondingly displays the same-frame picture. On the contrary, if a certain participant does not enable the same-frame mode, an online meeting interface of the participant does not display the same-frame picture.

In some embodiments, it may be set that only a specific participation character submits a frame background image selection request in order to avoid waste of processing resources of a server which needs to generate same-frame pictures of different frame background images since different participants select different frame background images. The specific participation character may be a host client. Correspondingly, if a host enables same-frame mode and selects a frame background image, the host client may transmit a frame background image selection request to the server. The frame background image selection request may contain a participation identifier of a user corresponding to the host client (the participation identifier is used for representing a participation character). If the server determines that the participation character is the host, a frame background image of an online meeting is obtained based on the frame background image contained in the received frame background image selection request.

In one embodiment, after the participant joins the online meeting, whether to enable the same-frame mode may be selected. After the participant selects to enable the same-frame mode, the corresponding server receives a request for enabling the same-frame mode for the online meeting, and then obtains a frame background image corresponding to the online meeting.

In the process of obtaining the frame background image, the participant may select from a plurality of candidate frame background images after joining the online meeting, and the corresponding server obtains the frame background image selected by the participant. Alternatively, when a target online meeting is created, a meeting host (meeting creator) selects from a plurality of candidate frame background images, and after the online meeting is created, the server also obtains the frame background image corresponding to the online meeting. In some embodiments, the frame background image may also be a frame background image customized for the online meeting by the participant (meeting host or meeting creator), and the corresponding server obtains the frame background image corresponding to the online meeting. In some embodiments, the frame background image may also be a suitable frame background image automatically selected for the online meeting by the server based on a meeting scene of the online meeting. The meeting scene may be filled in by the meeting creator when the online meeting is created, and the frame background image corresponding thereto is stored in the server for different meeting scenes in advance, whereby after the online meeting is created, the frame background image suitable for the online meeting may be selected according to the meeting scene corresponding to the online meeting. The process of obtaining a frame background image is not limited in this embodiment.

For example, the frame background image of the online meeting is obtained according to the meeting scene of the online meeting. If the meeting scene set by the meeting creator when creating a meeting is an argument scene, the server may obtain, after receiving an online meeting creation request, a frame background image suitable for the meeting scene according to the argument scene in the online meeting creation request.

In some embodiments, a plurality of candidate frame background images are pre-stored in the server. The frame background images may be preset by a developer for different meeting scenes, or a user is allowed to customize added candidate frame background images according to the requirements of an actual online meeting scene during use to facilitate subsequent use.

Since the frame background image is used for integrally displaying video pictures corresponding to different participants, the frame background image at least contains a plurality of display positions, whereby different video pictures may be displayed at different display positions.

In some embodiments, the frame background image is stored in the server in the form of layout parameters. The layout parameters may be stored in the form of j son. In one illustrative example, the corresponding layout parameters of the frame background image may be as shown in Table 1.

TABLE 1

| | |
|---|---|
| layout_width | overall screen width |
| layout_height | overall screen height |
| layout_items | seat information |
| Layout_items.seat_id | seat number |
| layout_items.seat_order | seat order |
| layout_items.type | seat type |
| layout_items.pos | seat position |
| layout_items.size | rectangular size of seat |
| layout_items.margin | rectangular distance of seat |
| image_list | image information |
| image_list.url | image address |
| image_list.md5 | md5 information of image |
| image_list.seats | seat number occupied by image |

Figure 3:
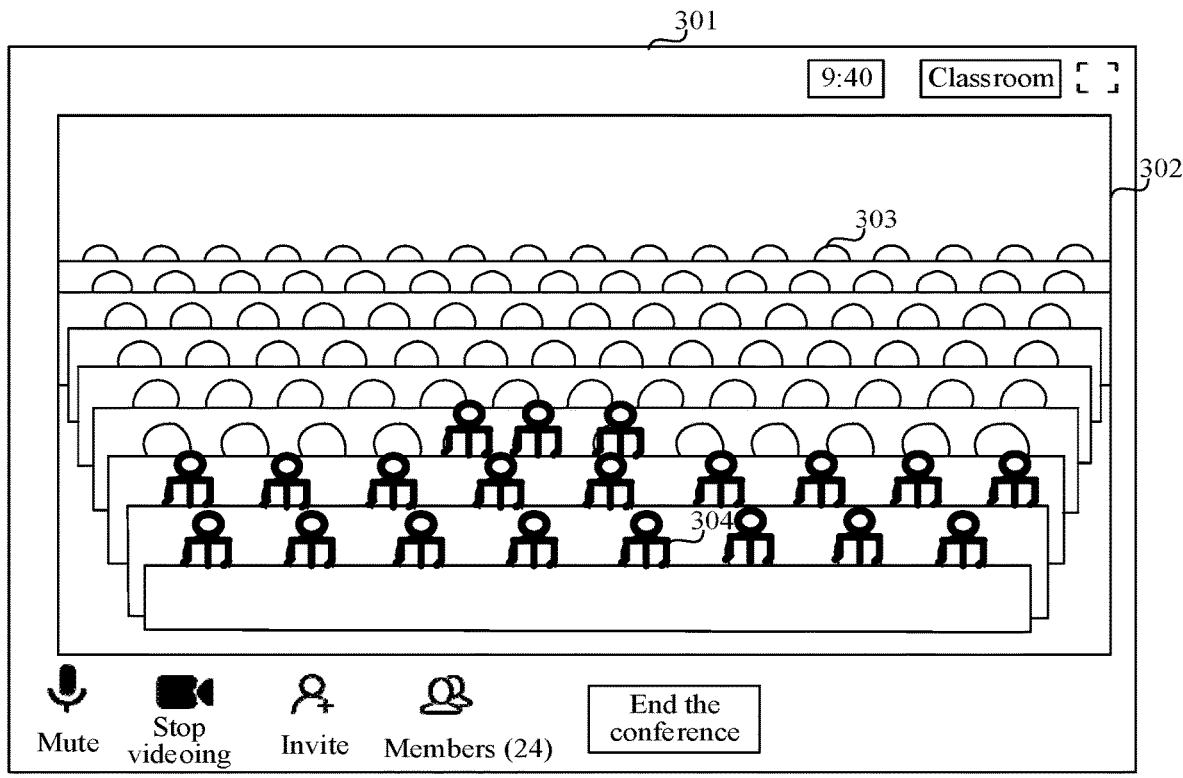
FIG. 3 shows a schematic interface diagram of an online meeting interface according to an embodiment of this application.

In this embodiment, the overall screen width in Table 1 is an image width corresponding to the frame background image, and the overall screen height is an image height corresponding to the frame background image. As shown in FIG. 3, both the overall screen width and the overall screen height are used for rendering the height and width of a same-frame picture 302.

Since the frame background image is used for integrating a plurality of participants and display positions or seats for placing video pictures corresponding to different participants will be provided in the corresponding frame background image, the layout parameters corresponding to the frame background image may also include seat-related information, such as seat information corresponding to each seat, a seat number, a seat order, a seat type, a seat position, a rectangular size of the seat, a rectangular distance of the seat, and the like. The seat number may be a seat id corresponding to each seat. For example, the seat id corresponding to the first seat may be 1. The seat order may be an order in which the current seat is located in all seats contained in the whole frame background image. For example, the seat number being 4 indicates that the seat is the fourth seat in the frame background image. The seat type is used for indicating an image type of the seat used for displaying, and may be divided into two types: a seat type used for rendering a video picture corresponding to a participant, and a seat type used for rendering other image pictures of an online meeting scene. That is to say, the seat type is not used for displaying the video picture corresponding to the participant, such as a classroom background image under a classroom scene. The seat position is used for representing a display position where the seat is located in the whole frame background image. For example, the seat position may be a position where the upper left corner of the seat is located in the frame background image. The rectangular size of the seat is also the size of a rectangular box occupied by the seat in the frame background image. The rectangular distance of the seat is also the distance of the seat from upper, lower, left, and right borders of the frame background image. As shown in FIG. 3, the same-frame picture 302 contains different seats 303.

In some embodiments, the frame background image further includes an image display position provided for some dynamic display images in the online meeting. The dynamic display image is different from the video picture corresponding to the participant. Correspondingly, the layout parameters in the frame background image may further include information such as image information, image address, md5 information of an image, and a seat number occupied by the image. The seat number occupied by the image is used for displaying the dynamic display image on a specific seat number in the frame background image. For example, if the seat number occupied by the image is 4, the image is displayed on the fourth seat in the frame background image.

Step 202: Generate a same-frame picture based on the frame background image and video pictures of participants, the video pictures of different participants being displayed at different positions of the frame background image.

Unlike the related art in which when a video picture is displayed in an online meeting interface, the video pictures of different participants are randomly and independently displayed in the online meeting interface, in this embodiment, a frame background image is provided, and the frame background image contains different display positions. The video pictures corresponding to the participants may be displayed at different positions in the frame background image, whereby the video pictures of different participants are sequentially displayed in the same frame background image, and then a same-frame picture corresponding to different participants is generated, to satisfy the display requirements of a meeting scene corresponding to a specific online meeting.

With regard to the manner of how to sequentially display participants at different positions in the frame background image, the participants may be displayed according to video access orders of different participants, may also be displayed according to roles of different participants, or may be displayed according to object types of different participants. This embodiment is not limited thereto.

When a same-frame picture is generated, video pictures of participants are required. Then after video access corresponding to the participants, clients of the participants need to upload the obtained video pictures to a server, whereby the server may generate the same-frame picture according to the video pictures uploaded thereby.

In some embodiments, in the same online meeting, there may be some participants that do not enable the same-frame mode and some participants that enable the same-frame mode, and regardless of whether the same-frame mode is enabled, the video pictures need to be uploaded, whereby the video pictures corresponding to all the participants are displayed in the frame background image.

Step 203: Push the same-frame picture to clients of the participants, whereby the clients display the same-frame picture in the online meeting interface.

In one embodiment, after the server generates a same-frame picture corresponding to the participants, the same-frame picture may be pushed to the clients corresponding to the participants. After receiving the same-frame picture, the corresponding clients may display the same-frame picture in the online meeting interface, to realize an online meeting interface display process in the same-frame mode.

In some embodiments, when the server pushes the same-frame picture to the clients, the same-frame picture may not need to be pushed to a participant in the online meeting which does not enable the same-frame mode, and only the video pictures of other participants except the current participant need to be pushed.

FIG. 3 shows a schematic interface diagram of an online meeting interface according to an embodiment of this application. A same-frame picture 302 is displayed in an online meeting interface 301, and video pictures corresponding to different participants in the same-frame picture are displayed at different positions in a frame background image (classroom). In some embodiments, the classroom contains a plurality of seat positions 303. A server may display the video pictures corresponding to different participants on different seat positions 303 according to preset rules. Schematically, a video picture (object picture) 304 corresponding to a participant is displayed at a fifth position on the left of the first row.

In summary, this embodiment provides same-frame mode in an online meeting scene, whereby after a client enables the same-frame mode, video pictures corresponding to participants may be displayed at different positions in a same frame background image, and the frame background image corresponds to a current online meeting. Specific position requirements in different online meeting scenes can be satisfied, and there is no need for the participants to actively adjust display positions of the video pictures corresponding to the participants in an online meeting interface, thereby improving the efficiency of adjusting display requirements of specific positions of the video pictures in the online meeting scene.

Since the display position in the frame background image is fixed, how to accurately display the video pictures corresponding to different participants at specified positions and satisfy the requirements of the participants is the key to further avoid the participants from adjusting the video pictures. Correspondingly, this embodiment provides several display position determination modes which can satisfy the user participation requirements to a certain extent.

Figure 4:
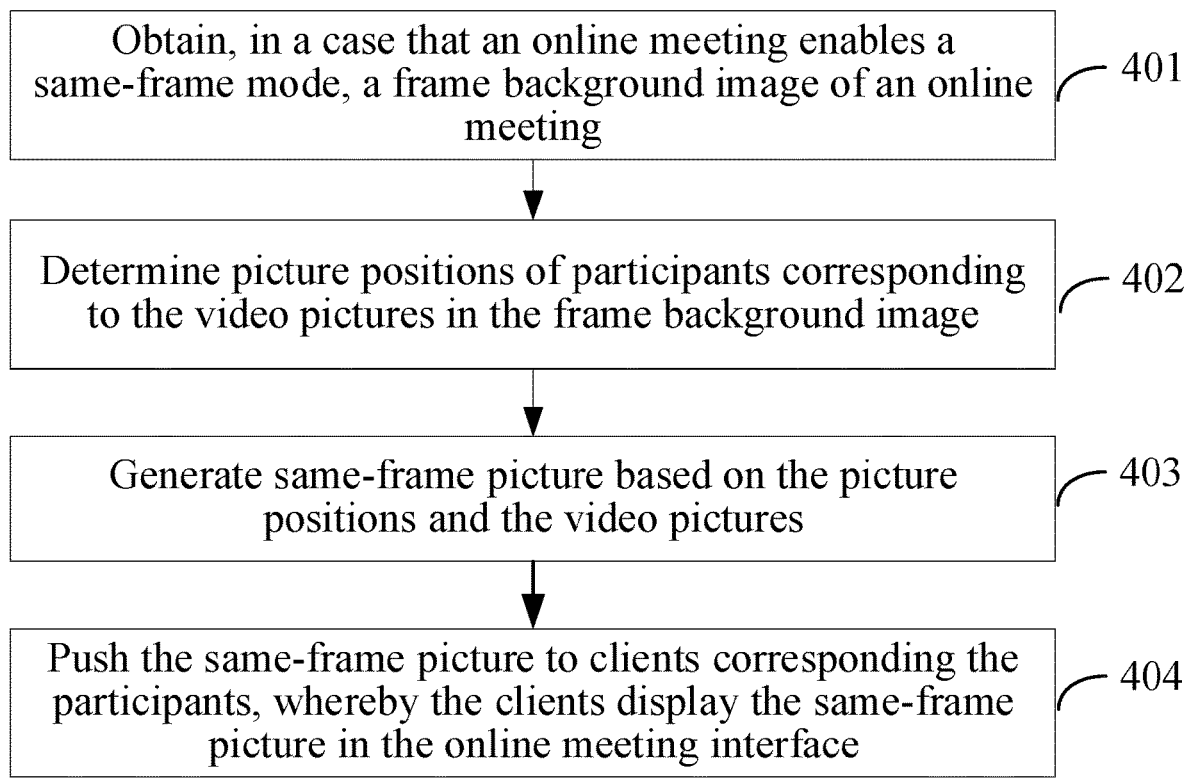
FIG. 4 shows a flowchart of an online meeting interface display method according to another embodiment of this application.

FIG. 4 shows a flowchart of an online meeting interface display method according to another embodiment of this application. This embodiment describes an example where the method is applied to the server in the online meeting system shown in FIG. 1. The method includes the following steps:

Step 401: Obtain, in response to that an online meeting enables same-frame mode, a frame background image of the online meeting.

In one embodiment, in response to that an online meeting enables same-frame mode, a meeting host or a meeting creator may select a frame background image corresponding to the online meeting on line, and transmit a frame background image selection request to the server. The corresponding server may obtain the frame background image corresponding to the online meeting according to the received frame background image selection request.

In some embodiments, in order to avoid a plurality of participants selecting different frame background images, a host client is configured to submit the frame background image selection request. Correspondingly, in one illustrative example, step 401 may include step 401A and step 401B.

Step 401A: Receive, in response to that the online meeting enables the same-frame mode, a frame background image selection request transmitted by a host client, the frame background image selection request containing the frame background image used by the online meeting.

In order to make the frame background image corresponding to the online meeting consistent with the requirements of the participants, in one embodiment, the frame background image corresponding to the online meeting may be selected by the meeting host, or by the meeting creator, and may also be selected by any participant. Schematically, the frame background image is selected by the meeting host. In response to that the online meeting enables the same-frame mode, a frame background image selection interface may be displayed in a client interface of the meeting host, and a plurality of candidate frame background images are displayed in the frame background image selection interface. When receiving a selection operation of the meeting host on a target frame background image, a host client corresponding to the meeting host may transmit a frame background image selection request to the server. The frame background image selection request at least includes an identifier corresponding to the frame background image selected by the meeting host. Correspondingly, the server may receive the frame background image selection request transmitted by the host client, and then determine a frame background image (target frame background image) used by the online meeting according to the identifier in the frame background image selection request.

The timing for selecting the frame background image by the meeting host or the meeting creator may be that after the online meeting is created and after the same-frame mode is selected, a frame background image selection interface is provided for selection, or the meeting creator may also select the frame background image when creating the online meeting and filling corresponding online meeting information. This embodiment is not limited thereto.

Step 401B: Obtain the frame background image of the online meeting based on the frame background image selection request.

In one embodiment, after receiving the frame background image selection request transmitted by the host client, the server may search for and obtain, according to an identifier corresponding to a (target) frame background image contained in the frame background image selection request, the frame background image required to be used by the online meeting from a frame background image library based on the identifier.

In order to provide a user with an alternative frame background image, a plurality of alternative frame background images corresponding to the same-frame mode need to be pre-stored in the server. Then when the user uses the same-frame mode function, the candidate frame background images may be pushed to a client corresponding to the user, and the corresponding client may display the received candidate frame background images for the user to select the candidate frame background images.

In some embodiments, different candidate frame background images may be set for different meeting scenes, and when the candidate frame background images are presented to the user, based on a meeting scene of a current online meeting, the candidate frame background images matching the meeting scene may be presented to the user, whereby the time for the user to find a suitable frame background image may be reduced.

In some embodiments, in order for the server to push the candidate frame background images to the client, a developer of the frame background image may configure the layout parameters of the various frame background images in advance in the server. Correspondingly, in one illustrative example, the process of setting a frame background image in a server may include the following steps:

1: Receive a setting request for the frame background image, the setting request containing layout parameters of the frame background image.

In some embodiments, the server provides an interface or a function capable of setting, adding, or modifying the frame background image externally, whereby during actual use, the user may also call the interface to achieve the setting purpose of the frame background image.

In one embodiment, the user may set the frame background image via a setting interface corresponding to the online meeting, for example, adding a frame background image, modifying the existing frame background image, etc. After setting and saving layout parameters, the client may transmit a setting request of the frame background image to the server. The setting request contains the setting layout parameters of the frame background image, and the corresponding server may receive the setting request of the frame background image transmitted by the client.

In some embodiments, when setting the layout parameters corresponding to the frame background image, the user may set the layout parameters via a specific setting webpage, and may also set the layout parameters via an online meeting APP. This embodiment is not limited thereto.

In some embodiments, the server allows developers of the online meeting to configure the layout parameters of the frame background image. In some embodiments, the server also allows the user to customize the frame background image using the online meeting APP, or to modify the original frame background image and submit layout parameters of the customized frame background image to the server.

2: Associatively store the layout parameters and the same-frame mode to render the same-frame picture using the frame background image based on the layout parameters.

In some embodiments, after receiving the setting request of the frame background image transmitted by the client, the server may obtain the layout parameters corresponding to the frame background image from the setting request, and then store the layout parameters in a specific storage region under the same-frame mode, whereby the corresponding frame background image may be rendered based on the layout parameters when subsequently using the same-frame mode function.

Figure 5:
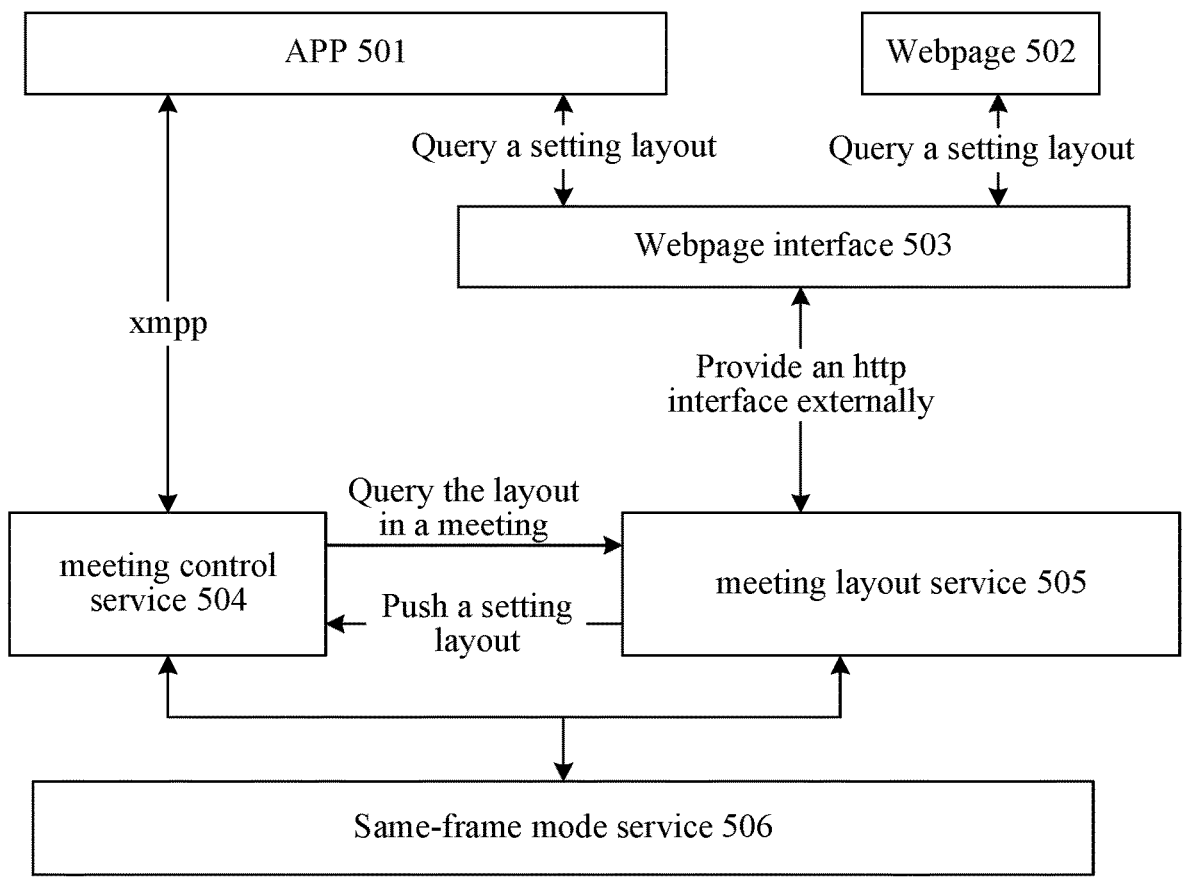
FIG. 5 shows a setting and use process of a frame background image according to an embodiment of this application.

FIG. 5 shows a setting and use process of a frame background image according to an embodiment of this application. A meeting layout service 505 provides an http interface to the outside, whereby a user may query a setting layout by calling a webpage interface 503 via an APP 501 and a webpage 502. After querying the layout from the meeting layout service 505, a meeting control service 504 may push to the APP 501 via an xmpp protocol. During the meeting interface display process, both the meeting control service 504 and the meeting layout service 505 may interact with same-frame mode service 506 to realize the generation and pushing of a same-frame picture.

Step 402: Determine picture positions of the participants corresponding to the video pictures in the frame background image.

Since a plurality of (display) positions are provided in the frame background image, how to display the video pictures of different participants at corresponding positions is the key to avoid the user adjusting the video pictures. Correspondingly, in one embodiment, after the server determines the frame background image corresponding to the online meeting and receives the video pictures uploaded by the participants, it is necessary to determine the picture positions of the video pictures corresponding to the participants in the frame background image, and then render the same-frame picture.

In some meeting scenes, video access orders of the participants have a certain rule. For example, the video access orders are determined according to a certain online meeting flow, or determined by the importance of the participants. Correspondingly, in order to show the rule in the same-frame picture, the picture positions (or display positions) of the video pictures corresponding to the participants in the frame background image may be determined according to the video access orders. In one illustrative example, step 402 may include step 402A and step 402B.

Step 402A: Obtain video access orders of the participants, the video access orders being orders in which the participants enable video access in the online meeting.

In one embodiment, after the participants enable video access, the clients of the participants upload collected video pictures to the server. Correspondingly, the server may determine video access orders corresponding to the participants enabling the video access in the online meeting according to a starting time when the video pictures uploaded by the participants are received, and then determine display positions of the video pictures corresponding to the participants in the frame background image according to the video access orders.

Step 402B: Determine target positions of the participants corresponding to the video pictures in the frame background image based on the video access orders.

In some embodiments, layout parameters corresponding to the frame background image may include position order identifiers of the positions. The positions indicate positions where the video pictures may be displayed. Correspondingly, in one embodiment, after obtaining the video access orders corresponding to the participants, the server may determine the picture positions of the video pictures corresponding to the participants in the frame background image according to a corresponding relationship between the video access orders and the position order identifiers.

In one illustrative example, if the frame background image contains k display seats, a video access order corresponding to a participant is the nth and corresponds to an nth position, an nth display seat may be determined as a picture position of a video picture corresponding to the participant, and n is a positive integer less than or equal to k.

Figure 6:
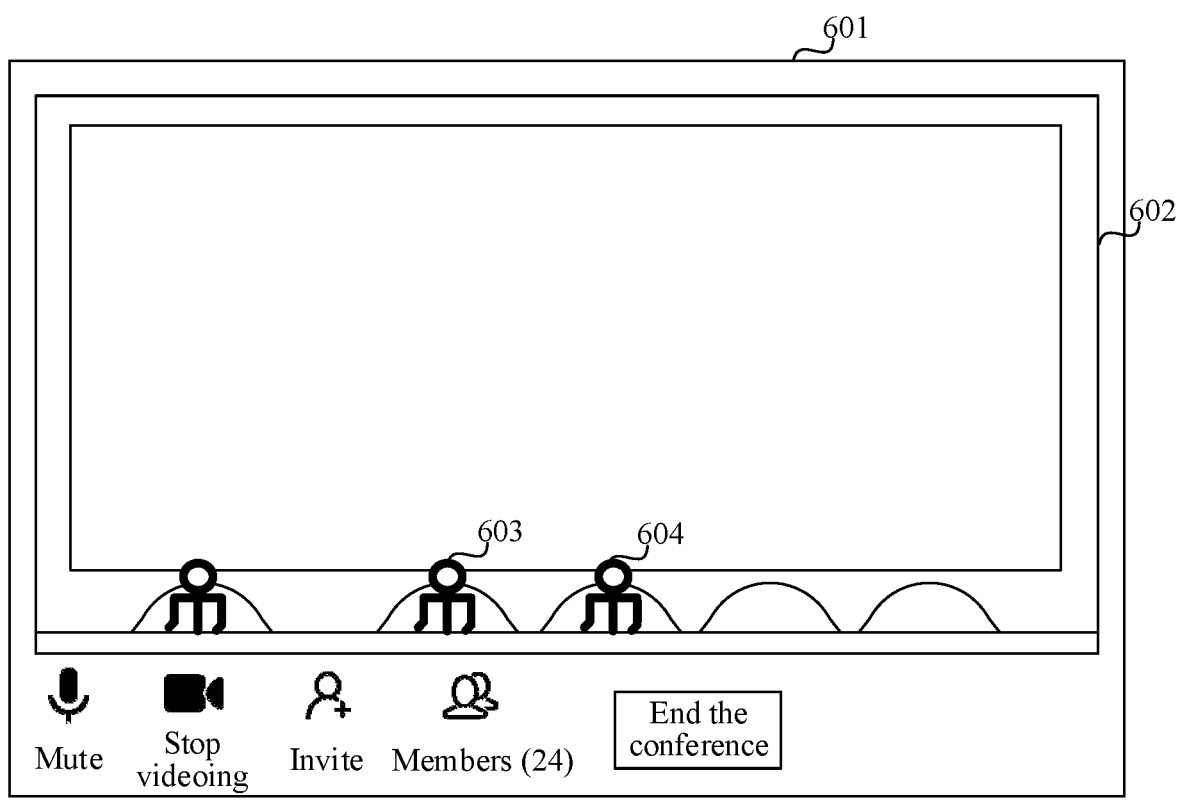
FIG. 6 shows a target position determination process according to an embodiment of this application.

FIG. 6 shows a picture position determination process according to an embodiment of this application. A same-frame picture 602 is displayed in an online meeting interface 601. If a video access order corresponding to a participant is second, an object picture (video picture) 603 corresponding to the participant is displayed at a second left position. If a video access order corresponding to a participant is third, an object picture (video picture) 604 corresponding to the participant is displayed at a third left position.

In another application scenario, for example, online debate between two parties, online meeting between two parties, etc., it may be necessary to display a character relationship between two or more parties in the online meeting interface. In order to not only ensure that the participants are displayed in the same frame in the online meeting interface, but also to respectively embody the character relationship between the participants. In one embodiment, the server may determine picture positions of the corresponding video pictures in the frame background image according to roles of the participants in a target online meeting. Correspondingly, in another illustrative example, step 402 may further include step 402C and step 402D.

Step 402C: Obtain participation identifiers of the participants, the participation identifiers representing roles of the participants in the online meeting.

In one embodiment, while uploading the video pictures to the server, the clients corresponding to the participants may also carry participation identifiers corresponding to the roles of the participants in the online meeting, whereby the servers may obtain the participation identifiers corresponding to the participants, and then determine the picture positions of the video pictures displayed in the frame background image according to the participation identifiers.

Schematically, taking an online debate as an example, the participation identifiers of the participants may be the first debater in cons, the first debater in pros, a host, and the like.

Step 402D: Determine the picture positions of the participants corresponding to the video pictures in the frame background image based on the participation identifiers.

In some embodiments, the layout parameters of the frame background image may also indicate roles corresponding to the display positions. In one embodiment, after obtaining the participation identifiers corresponding to the participants, namely, specifying the roles of the participants in the online meeting, the server may further arrange picture positions of the video pictures corresponding to the participants in the frame background image according to the roles, for example, arranging participants belonging to the same party on one side of the frame background image.

In one example, taking an online debate as an example, participants belonging to debaters in pros may be displayed at left region positions of the frame background image, participants belonging to debaters in cons may be displayed at right region positions of the frame background image, and participants belonging to the same party may be displayed in an order of the first debater, the second debater, the third debater, and the like.

Figure 7:
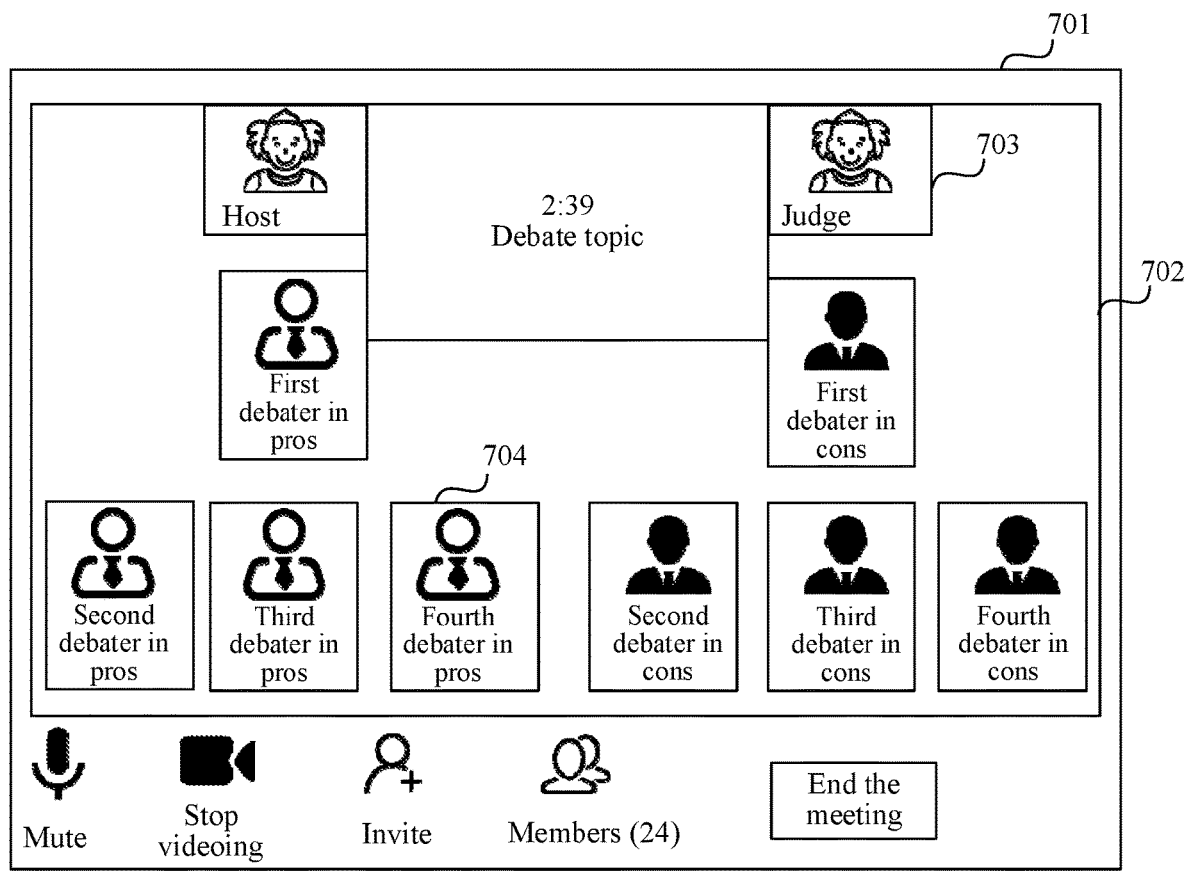
FIG. 7 shows a target position determination process according to another embodiment of this application.

FIG. 7 shows a picture position determination process according to an embodiment of this application. A same-frame picture 702 is displayed in an online meeting interface 701. If a participant is a judge, after the participant corresponding to the judge accesses an online meeting, a video picture 703 corresponding to the judge is correspondingly displayed at the position of the judge. When the participant is the fourth debater in pros and it is determined that the participant corresponding to the fourth debater in pros accesses the online meeting, a video picture 704 corresponding to the fourth debater in pros is correspondingly displayed at the position of the fourth debater in pros.

In some embodiments, a function is provided for a user to autonomously select corresponding determination modes of the picture positions. When the online meeting creator is creating an online meeting, if the online meeting creator selects to enable same-frame mode, a plurality of determination modes may be provided for the user. For example, the candidate determination modes include mode 1 (determining according to a video access order), mode 2 (determining according to a participation character), and mode 3 (customized setting). The meeting creator may select any determination mode. Then during the online meeting, the server may automatically determine the corresponding picture positions of the video pictures in the frame background image according to the submitted determination modes. In some embodiments, if the determination mode is mode 2, after the other participants join the online meeting, the server may transmit a meeting role obtaining request to the clients of the participants to obtain the roles of the participants in the online meeting. If the meeting creator selects mode 1, the other participants do not need to set the roles when joining the online meeting.

Step 403: Generate the same-frame picture based on the picture positions and the video pictures.

In one embodiment, when the server determines the picture position of the video picture corresponding to the participant newly accessing in the frame background image, a rendered same-frame picture may be generated based on rendering the display video picture at the picture position.

Step 404: Push the same-frame picture to clients corresponding the participants, whereby the clients display the same-frame picture in the online meeting interface.

The implementation of step 404 may refer to the above embodiment. This embodiment is not limited thereto.

In some embodiments, the participants may also adjust the positions of the video pictures in the same-frame picture. When the same-frame picture generated by the server according to the foregoing position determination rule does not meet the requirements of the participants, in one embodiment, the server also provides a function of self-adjusting the display positions of the video pictures in the same-frame picture by the participants.

The process of adjusting the display positions in the same-frame picture may include the following step 3 and step 4.

Step 3: Receive a position adjustment instruction of the host client on the video pictures in the same-frame picture.

In order to avoid chaos in the same-frame picture due to adjustment of the same-frame picture by the participants, in one embodiment, a meeting host or a meeting creator is allowed to have a position adjustment permission for the video pictures in the same-frame picture. Correspondingly, when there is a need for adjusting the display position of a certain video picture in the same-frame picture by the meeting host, the video picture may be dragged and moved to a position which needs to be adjusted, then the host client receives a position adjustment operation on the video picture and transmits a position adjustment instruction to the server, and the corresponding server receives the position adjustment instruction of the host client on the video picture in the same-frame picture. The position adjustment instruction contains an object identifier of a participant corresponding to the video picture which needs to be adjusted and an adjusted picture position identifier.

Step 4: Update the same-frame picture based on the position adjustment instruction, and push an updated same-frame picture to the clients of the participants.

In some embodiments, after receiving the position adjustment instruction, the server may update the picture position of the video picture indicated by an object identifier in the frame background image according to the object identifier and a picture position identifier contained in the position adjustment instruction, generate an updated same-frame picture, and push the updated same-frame picture to the clients corresponding to other participants.

In this embodiment, picture positions of video pictures corresponding to the participants in the frame background image may be determined through video access orders corresponding to the participants or roles corresponding to the participants. In response to that the participants may be displayed in the same frame background image, the requirement of a meeting scene corresponding to an online meeting may also be taken into account, thereby reducing an adjustment operation of the participants on the display positions of the video pictures. Furthermore, in one application scenario, when the same-frame mode is enabled, the server may generate a virtual robot, the virtual robot joins the online meeting, and then the virtual robot processes received video streams of the participants to generate the same-frame picture.

Figure 8:
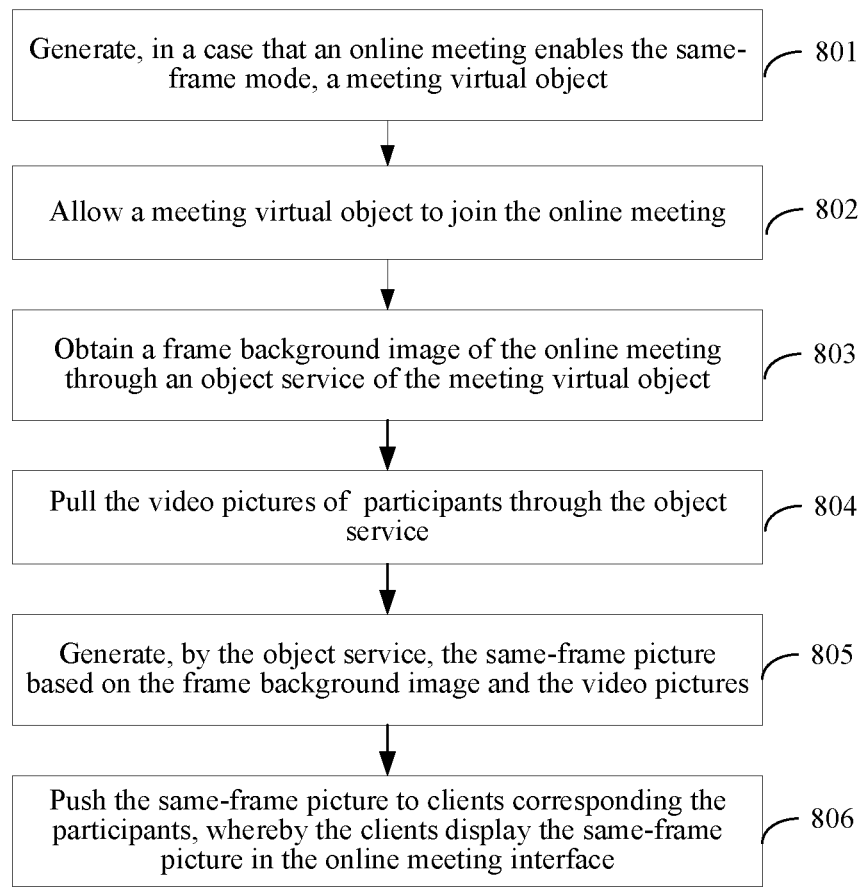
FIG. 8 shows a flowchart of an online meeting interface display method according to another embodiment of this application.

FIG. 8 shows a flowchart of an online meeting interface display method according to another embodiment of this application. This embodiment describes an example where the method is applied to the server in the online meeting system shown in FIG. 1. The method includes the following steps:

Step 801: Generate, in response to that the online meeting enables the same-frame mode, a meeting virtual object.

In the same-frame mode, a meeting robot (meeting virtual object) function is introduced. The meeting virtual object is used for generating the same-frame picture corresponding to the online meeting.

In one embodiment, when the online meeting enables the same-frame mode, the server creates the meeting virtual object corresponding to the online meeting.

Step 802: Allow the meeting virtual object to join the online meeting.

Since the meeting virtual object serves the generation process of the same-frame picture, in order to enable the meeting virtual object to obtain video pictures corresponding to the participants, the meeting virtual object needs to be added into the online meeting. In one embodiment, after creating the meeting virtual object, the server initiates a meeting join request. After responding to the meeting join request, the meeting virtual object joins the online meeting.

Figure 9:
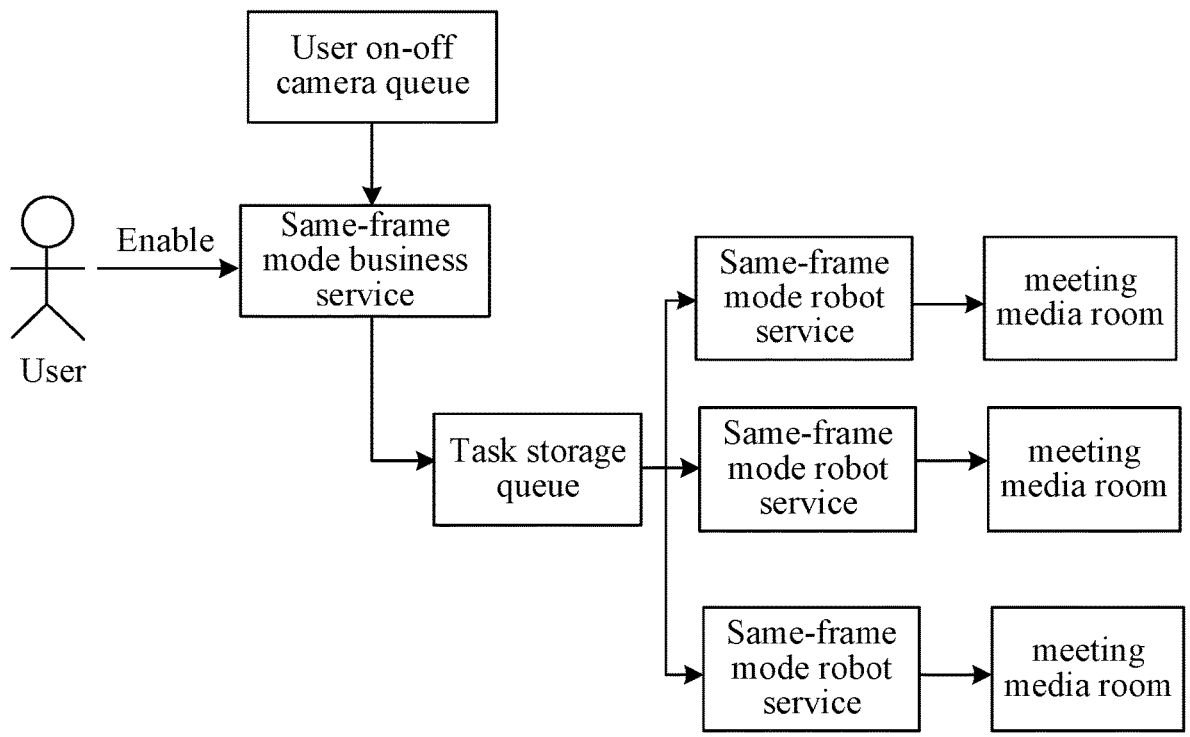
FIG. 9 shows a service flowchart of same-frame mode system according to an embodiment of this application.

FIG. 9 shows a service flowchart of same-frame mode system according to an embodiment of this application. When a user enables the same-frame mode, after receiving same-frame mode enabling request, same-frame mode business service (server) puts same-frame mode enabling task into a task storage queue, and a meeting robot preempts the task. When the meeting robot preempts the same-frame mode task, same-frame mode robot service controls the meeting robot to enter a meeting media room corresponding to an online meeting according to request parameters in the task, and performs a subsequent rendering generation process of a same-frame picture. It can be seen that different meeting robots correspond to different target online meetings, i.e. the same-frame mode tasks corresponding to the same online meeting may only be obtained by one meeting robot service. In some embodiments, a user on-off camera queue is also transmitted to the same-frame mode business service for subsequent generation of the same-frame picture.

Step 803: Obtain the frame background image of the online meeting through an object service of the meeting virtual object.

In one embodiment, when a meeting virtual object (meeting robot) joins an online meeting, a subsequent same-frame picture generation process may be executed by an object service corresponding to the meeting virtual object, and correspondingly, a frame background image corresponding to the online meeting is obtained via the object service.

Step 804: Pull the video pictures of the participants through the object service.

In some embodiments, after the server receives video streams uploaded by the participants, the corresponding object service also pulls the video pictures of the participants from the server.

Step 805: Generate, by the object service, the same-frame picture based on the frame background image and the video pictures.

In some embodiments, after the object service obtains the video pictures of the participants and the frame background image of the online meeting, the same-frame picture may be generated according to the frame background image and the video pictures.

The process of generating the same-frame picture based on the frame background image and the video pictures may refer to the above embodiments, and will not be described in detail in this embodiment.

In some embodiments, in the above embodiments, the video pictures corresponding to the participants are displayed in the frame background image. In other possible implementations, in response to that there are more participants, the video pictures corresponding to some participants may be selected to be displayed in the same frame background image according to the roles of the participants, while the video pictures corresponding to other participants are independently displayed at the periphery of (around) the frame background image.

In one illustrative example, the process of generating the same-frame picture based on the frame background and the video pictures corresponding to the participants may further include the following step 5 to step 7.

Step 5: Obtain participation identifiers of the participants, the participation identifiers representing roles of the participants in the online meeting.

The roles represent the importance and necessity of the participants. For example, for an online debate, if the importance of a judge is significantly lower than the importance of debaters, video pictures of the debaters may be displayed preferentially in the frame background image. Therefore, in one embodiment, it may be determined whether to display the corresponding video pictures in the frame background image according to the roles of the participants in the online meeting, and the corresponding servers need to obtain the participation identifiers corresponding to the participants.

Step 6: Divide the participants into a first object set and a second object set based on the participation identifiers.

In one embodiment, the participants may be divided into a first object set and a second object set based on whether the roles of the participants indicated by the participation identifiers are required to be displayed in the frame background image. The participants contained in the first object set are objects required to be displayed in the same frame background image, and the participants contained in the second object set are objects not required to be displayed in the frame background image.

Taking online debate as an example, a host and a judge may belong to the second object set, while the debaters belong to the first object set.

Step 7: Display the video pictures of the participants in the first object set in the frame background image, and display the video pictures of the participants in the second object set around the frame background image to generate the same-frame picture.

Since the importance level of the participants contained in the first object set is higher than the importance level of the participants contained in the second object set, in one embodiment, a video picture corresponding to the first object set is preferentially displayed in the same frame background image, and a video picture corresponding to the object set is independently displayed at the periphery of (around) the frame background image, thereby generating the same-frame picture.

In some embodiments, the division criteria for the first object set and the second object set may also be customized by the meeting creator or the meeting host.

Figure 10:
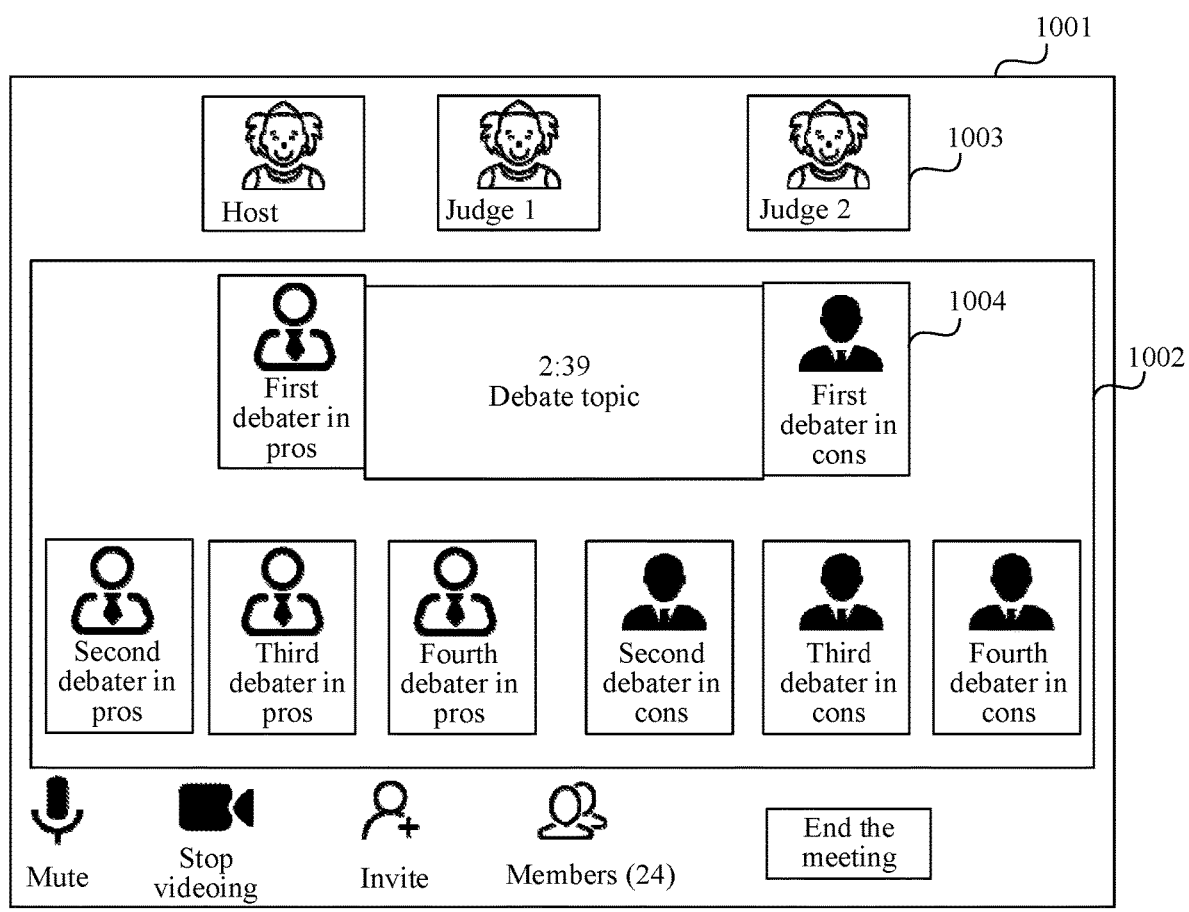
FIG. 10 shows a schematic diagram of an online meeting interface according to an embodiment of this application.

FIG. 10 shows a schematic diagram of an online meeting interface according to an embodiment of this application. Taking an online debate as an example, video pictures corresponding to participants are displayed in an online meeting interface 1001. Video pictures 1004 of the participants having roles as debaters are displayed in a same-frame picture 1002. Video pictures 1003 of the participants having roles as judges are displayed around the same-frame picture 1002, and the video pictures of judge 1, judge 2, and a host are independently displayed.

Step 806: Push the same-frame picture to clients corresponding the participants, whereby the clients display the same-frame picture in the online meeting interface.

The implementation of step 806 may refer to the above embodiment. This embodiment is not limited thereto.

Figure 11:
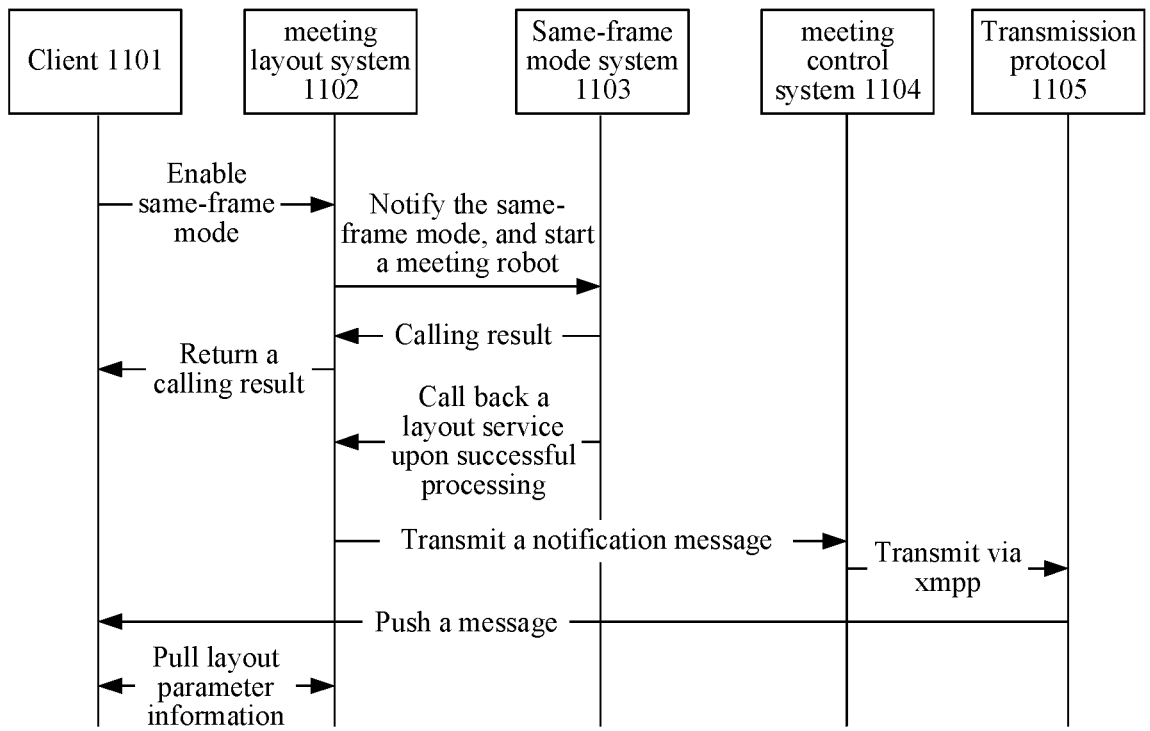
FIG. 11 shows an interaction timing diagram in same-frame mode according to an embodiment of this application.

FIG. 11 shows an interaction timing diagram in same-frame mode according to an embodiment of this application. After enabling same-frame mode, a client 1101 transmits same-frame mode enabling request to a meeting layout system 1102. After receiving the same-frame mode enabling request, the meeting layout system 1102 notifies same-frame mode system 1103 to start a meeting robot. When the same-frame mode system 1103 successfully starts the meeting robot, a calling result is fed back to the client 1101 via the meeting layout system 1102. After the processing is successful, a layout service is called back. Correspondingly, the meeting layout system 1102 may push a notification message to the client via a meeting control system 1104 (the notification message may include entering and exiting by participants, participant statuses, and layout change). The meeting control system 1104 may push the message via an xmpp transmission protocol 1105. The client 1101 may pull layout parameter information from the meeting layout system 1102.

In this embodiment, by introducing a meeting virtual object in the same-frame picture generation process, the interference of different online meetings corresponding to the same-frame picture generation process can be avoided to ensure the normal execution of a same-frame task. By displaying part of the participants in the same frame background image, it is possible to avoid the situation that the participants cannot be matched to a suitable frame background image due to too many participants.

The above embodiments mainly describe the process of how to generate a same-frame picture from the perspective of a server side. This embodiment describes the display process of an online meeting interface from the perspective of clients corresponding to participants.

Figure 12:
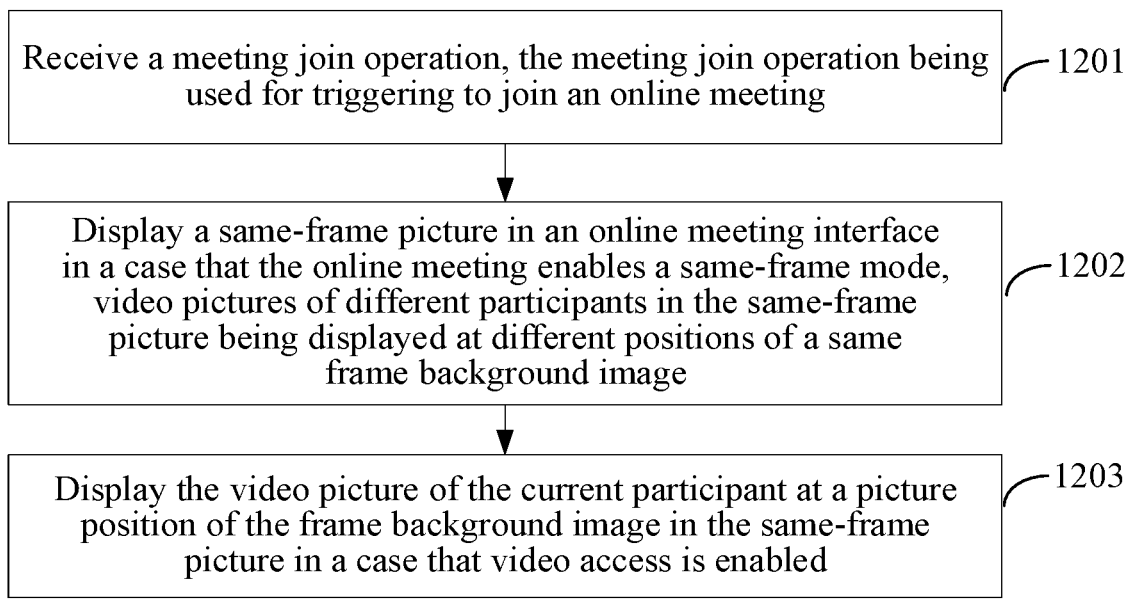
FIG. 12 shows a flowchart of an online meeting interface display method according to an embodiment of this application.

FIG. 12 shows a flowchart of an online meeting interface display method according to an embodiment of this application. This embodiment describes an example where the method is applied to the terminal in the online meeting system shown in FIG. 1. The method includes the following steps:

Step 1201: Receive a meeting join operation, the meeting join operation being used for triggering to join an online meeting.

In some embodiments, the meeting join operation refers to an operation of inputting a meeting number in a client to join an online meeting. The meeting number is used for uniquely identifying the online meeting.

In some embodiments, after receiving the meeting join operation, the terminal transmits a meeting join request to a server and requests to join the online meeting. The meeting join request at least includes the meeting number of the online meeting and an account number of the client (used for determining an identity of a participant).

Figure 13:
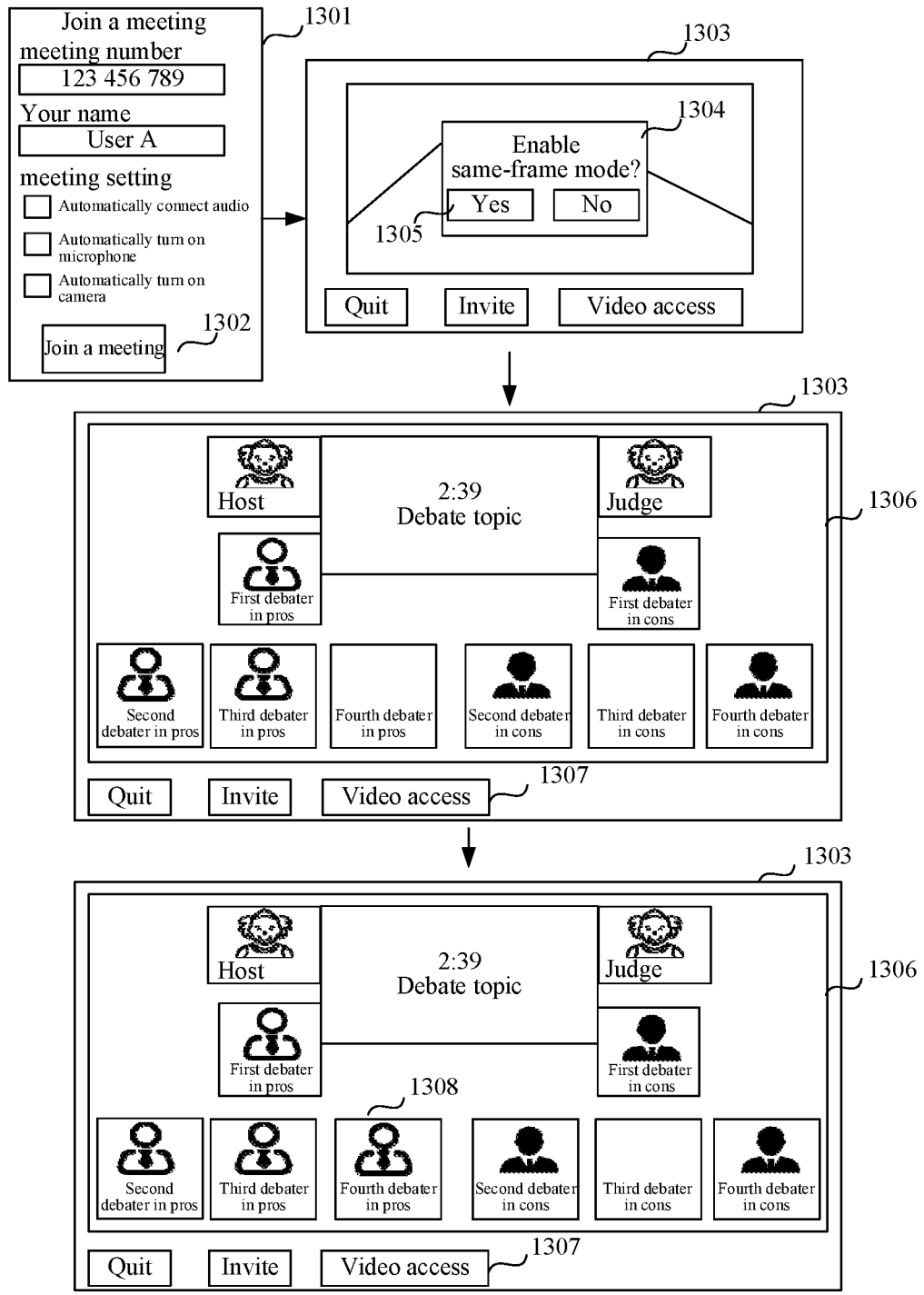
FIG. 13 shows a schematic diagram of a process for displaying a same-frame picture according to an embodiment of this application.

Schematically, FIG. 13 shows a schematic diagram of a process for displaying a same-frame picture according to an embodiment of this application. After inputting a meeting number and filling in a name in a meeting join interface 1301 of the client, a user clicks/taps a meeting join control 1302 to join an online meeting.

Step 1202: Display a same-frame picture in an online meeting interface in response to that the online meeting enables same-frame mode, video pictures of different participants in the same-frame picture being displayed at different positions of a same frame background image.

In one embodiment, when joining the online meeting, the user may determine whether to enable same-frame mode. When the same-frame mode is selected to be enabled, a same-frame picture will be displayed in an online meeting interface. On the contrary, if the user selects not to enable the same-frame mode, the online meeting interface does not display the same-frame picture but displays independently displayed video pictures.

As shown in FIG. 13, when the user triggers the meeting join control 1302, an online meeting interface 1303 may be displayed, and prompt information 1304 is displayed in the online meeting interface 1303 for prompting whether to enable the same-frame mode. Enabling the same-frame mode may be triggered by clicking/tapping a confirmation control 1305, and a same-frame picture 1306 is correspondingly displayed in the online meeting interface 1303.

Step 1203: Display the video picture of the current participant at a picture position of the frame background image in the same-frame picture in response to that video access is enabled.

In one embodiment, after joining the online meeting, the user may also determine whether to enable video access. After enabling the video access, on the premise of enabling the same-frame mode, a video picture corresponding to the current participant will be displayed at a picture position of the frame background image in the same-frame picture.

In some embodiments, the picture position where the video picture corresponding to the current participant is displayed in the frame background image may be determined by the video access order of the current participant, may also be determined by the participation identifier (representing the meeting role) of the current participant, and may also be determined by a setting operation of the meeting creator or the meeting host.

As shown in FIG. 13, when the user needs video access, the video access may be triggered through a video access control 1307 in the online meeting interface 1303. If a meeting role corresponding to "user A" is the fourth debater in pros, a video picture 1308 corresponding to "user A" will be displayed at the position of the fourth debater in pros in the same-frame picture 1306.

The process of how to generate the same-frame picture may refer to the above embodiments, and will not be described in detail in this embodiment.

In summary, this embodiment provides same-frame mode in an online meeting scene, whereby after a client enables the same-frame mode, video pictures corresponding to participants may be displayed at different positions in a same frame background image, and the frame background image corresponds to a current online meeting. Specific position requirements in different online meeting scenes can be satisfied, and there is no need for the participants to actively adjust display positions of the video pictures corresponding to the participants in an online meeting interface, thereby improving the efficiency of adjusting display requirements of specific positions of the video pictures in the online meeting scene.

The picture position of the video picture of the current participant in the frame background image is consistent with the expectation of the user, for example, conforms to the meeting role of the user. In one embodiment, the current participant may preset a meeting role in the online meeting and submit the meeting role to the server, and the corresponding server may display a corresponding video picture at a picture position matching the meeting role based on the meeting role of the current participant.

Figure 14:
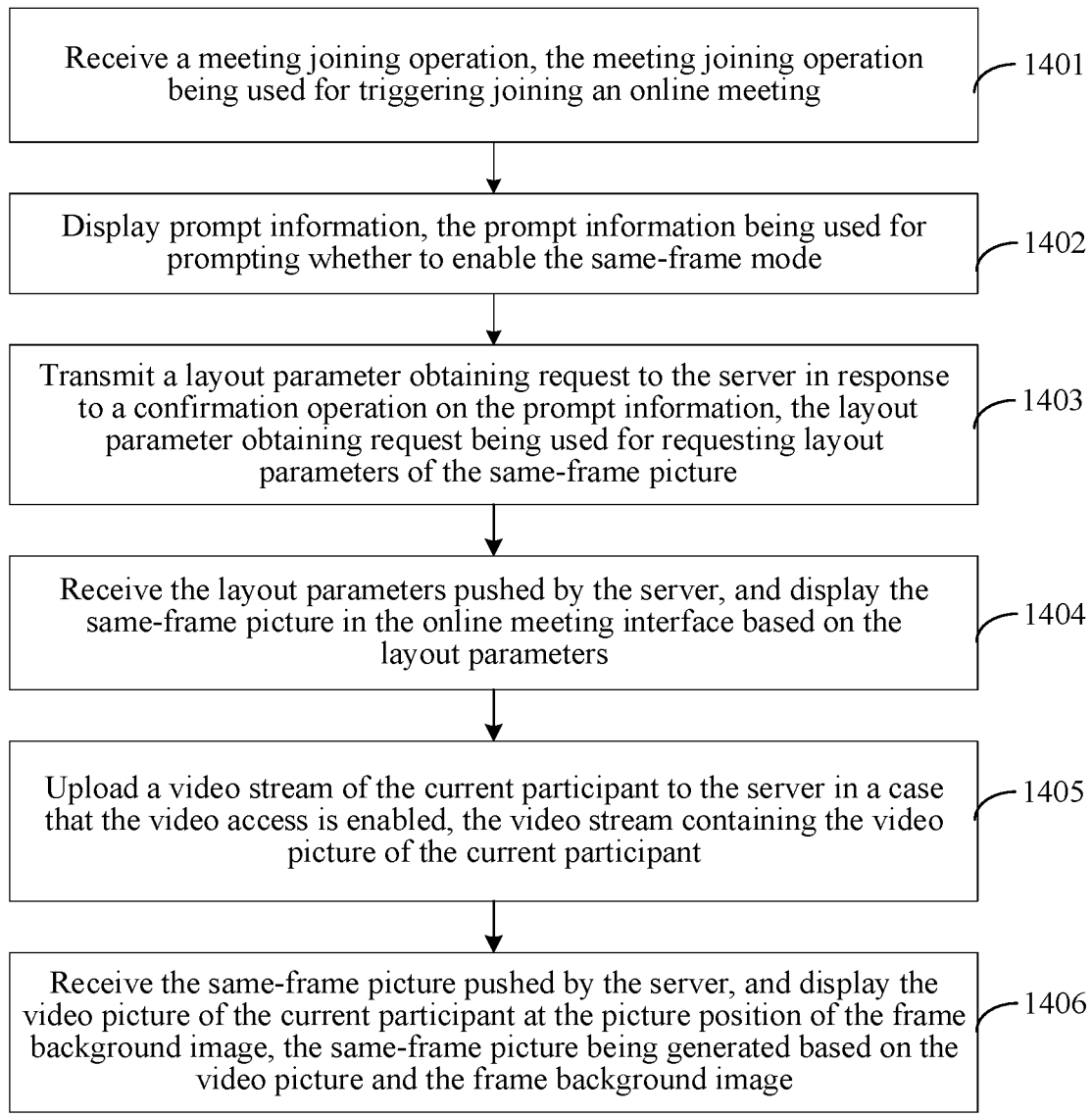
FIG. 14 shows a flowchart of an online meeting interface display method according to another embodiment of this application.

FIG. 14 shows a flowchart of an online meeting interface display method according to another embodiment of this application. This embodiment describes an example where the method is applied to the terminal in the online meeting system shown in FIG. 1. The method includes the following steps:

Step 1401: Receive a meeting join operation, the meeting join operation being used for triggering to join an online meeting.

The implementation of step 1401 may refer to the above embodiment. This embodiment is not limited thereto.

Step 1402: Display prompt information, the prompt information being used for prompting whether to enable the same-frame mode.

In one embodiment, when the user joins the online meeting, prompt information may be automatically displayed for prompting the user whether to enable the same-frame mode, and the user may determine whether to enable the same-frame mode through a confirmation operation or a rejection operation on the prompt information.

In some embodiments, same-frame mode control may be provided in the online meeting interface, and the user may determine to enable the same-frame mode through an enabling operation of the same-frame mode control, or determine to disable the same-frame mode through a disabling operation of the same-frame mode control.

Step 1403: Transmit a layout parameter obtaining request to the server in response to a confirmation operation on the prompt information, the layout parameter obtaining request being used for requesting layout parameters of the same-frame picture.

In one embodiment, when the user determines to enable the same-frame mode, a confirmation control corresponding to a prompt message may be clicked/tapped, and the corresponding terminal receives a confirmation operation on prompt information and determines to enable the same-frame mode. A layout parameter obtaining request corresponding to the same-frame picture in the same-frame mode is transmitted to the server to obtain layout parameters, and then the same-frame picture is displayed based on the layout parameters.

Step 1404: Receive the layout parameters pushed by the server, and display the same-frame picture in the online meeting interface based on the layout parameters.

In some embodiments, after receiving the layout parameter obtaining request transmitted by the client, if there is no participant enabling video access temporarily, the server may only feed the layout parameters of the frame background image corresponding to the online meeting back to the terminal. If there is a participant to enable video access, the server may feed the generated layout parameters of the same-frame picture back to the terminal, whereby the terminal may display the same-frame picture in the online meeting interface according to the layout parameters after receiving the layout parameters.

Figure 15:
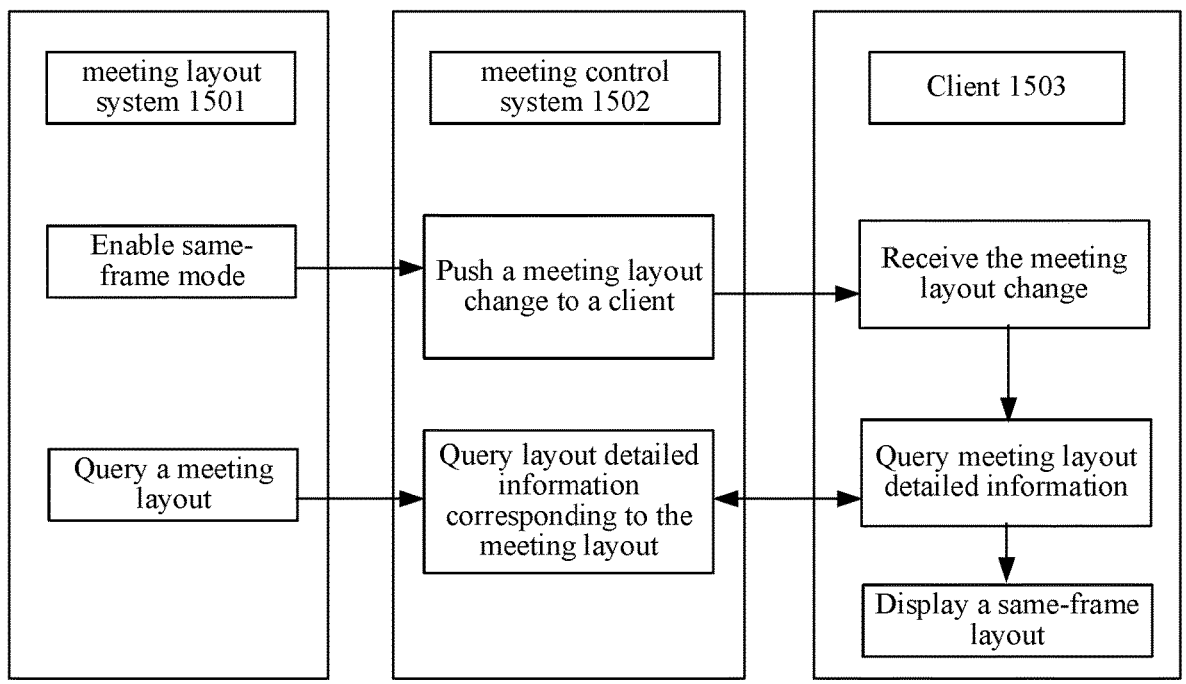
FIG. 15 shows a push interaction diagram of layout information according to an embodiment of this application.

FIG. 15 shows a push interaction diagram of layout information according to an embodiment of this application. Both a meeting control system 1502 and a meeting layout system 1501 are servers. After receiving a request for enabling same-frame mode, the meeting layout system 1501 pushes a meeting layout change to a client 1503 via the meeting control system 1502, and the client 1503 correspondingly receives the meeting layout change, and further queries changed meeting layout detailed information to the meeting control system 1502. Meanwhile, the meeting layout system 1501 feeds the queried meeting layout back to the meeting control system 1502, which feeds the meeting layout back to the client 1503, and the client 1503 correspondingly displays the same-frame layout in the online meeting interface according to the queried meeting layout detailed information.

In some embodiments, the meeting layout system 1501 is configured to manage the layout function of the entire online meeting, and at the beginning of each online meeting, the meeting layout system 1501 is queried to obtain layout information for the meeting. The same-frame mode in this embodiment is a special meeting layout belonging to an online meeting. In some embodiments, the meeting layout system 1501 also provides the functions of layout modification, query, and reset to the outside. When the user wants to enable the same-frame mode layout, all layout information is obtained by querying a layout interface ClientQueryStoreLayoutV2. When a certain same-frame mode is selected, the client calls the modified layout ClientSelectStoreLayoutV2 interface of the layout system for applying certain layout information to the same-frame mode. When certain layout information is to be canceled, a ResetLayoutV2 interface is called to cancel the certain layout information.

In some embodiments, the meeting control system 1502 is primarily a meeting management system. Meeting management, message push, and other functions are mainly included. Functions related to this embodiment are two functions: an online meeting layout information pushing function and a meeting layout robot. The layout information pushing indicates that after a meeting layout module sets the layout, the layout module triggers a meeting layout change message, and the meeting control system 1502 pushes the message to the client, and then processes the query detailed layout function of the client. The meeting robot function is that after enabling the same-frame mode, the robot initiates a meeting join request. A meeting control background receives a meeting join request of the robot, and updates a robot member cache. When the robot successfully joins a media room, the robot side initiates a notify request to the meeting control background to notify the meeting control background that the robot has successfully joined the media room. After receiving the notify request, the meeting control side pushes a user existing in the meeting to the robot side, and also pushes the robot to other users in the meeting. The whole robot joining process is completed. After the robot successfully joins the meeting, a plurality of video user pictures is cut and combined into a new picture function, and user video stream data will be detected and processed.

Step 1405: Upload a video stream of the current participant to the server in case that the video access is enabled, the video stream containing the video picture of the current participant.

In one embodiment, when the user enables video access, the client acquires a video picture of a current participant via a camera, and encapsulates the acquired video picture into a video stream to upload the video stream of the current participant to the server.

Step 1406: Receive the same-frame picture pushed by the server, and display the video picture of the current participant at the picture position of the frame background image, the same-frame picture being generated based on the video picture and the frame background image.

In some embodiments, after receiving the video stream of the current participant, the server may parse the video stream to obtain a video picture of the current participant, and then determine a display position (picture position) of the video picture corresponding to the participant in the frame background image to display the video picture at the picture position, generate an updated same-frame picture, and push the updated same-frame picture to the clients corresponding to the participants, whereby the terminal (client) may display the video picture of the current participant at the picture position of the frame background image according to the same-frame picture pushed by the server.

In the above embodiments, a picture position where a video picture corresponding to a participant is located in a frame background image corresponds to a picture position where a video picture corresponding to a current participant is located in the frame background image, which may be a corresponding position where a video access order corresponding to the current participant is located in the frame background image. The picture position may also be a meeting role of the current participant in the online meeting, and a corresponding position in the frame background image. The picture position may also be a position set by a meeting host in the online meeting.

In response to that the picture position is set according to the meeting role corresponding to the current participant, in one embodiment, after the online meeting enables the same-frame mode, the participant is required to set the meeting role thereof in the online meeting. The corresponding terminal receives a meeting role setting operation, determines a meeting role corresponding to the current participant, and then uploads a participation identifier corresponding to the meeting role to the server, whereby the server determines a picture position of the video picture corresponding to the current participant in the frame background image according to the meeting role.

In this embodiment, through the interaction between the terminal and the server, an obtaining process of layout parameters corresponding to the same-frame picture may be realized, and then the same-frame picture is displayed in an online meeting interface in the client. Furthermore, a meeting role setting operation is provided at the terminal side, whereby the server may determine target positions of the video pictures corresponding to the participants in the frame background image according to the set roles, which is advantageous for making the generated same-frame picture more consistent with the requirements of users for the online meeting scene.

Figure 16:
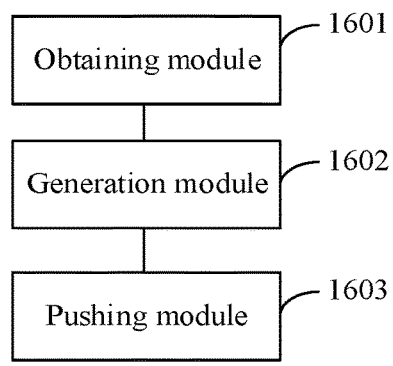
FIG. 16 is a structural block diagram of an online meeting interface display apparatus according to an embodiment of this application.

FIG. 16 is a structural block diagram of an online meeting interface display apparatus according to an embodiment of this application. The apparatus includes:

an obtaining module 1601, configured to obtain, in response to that an online meeting enables same-frame mode, a frame background image of the online meeting;

a generation module 1602, configured to generate a same-frame picture based on the frame background image and video pictures of participants, the video pictures of different participants being displayed at different positions of the frame background image; and a pushing module 1603, configured to push the same-frame picture to clients of the participants, whereby the clients display the same-frame picture in the online meeting interface.

In some embodiments, the generation module 1602 is further configured to:

determine picture positions of the participants corresponding to the video pictures in the frame background image; and generate the same-frame picture based on the picture positions and the video pictures.

In some embodiments, the generation module 1602 is further configured to:

obtain video access orders of the participants, the video access orders being orders in which the participants enable video access in the online meeting; and determine the picture positions of the participants corresponding to the video pictures in the frame background image based on the video access orders.

In some embodiments, the generation module 1602 is further configured to:

obtain participation identifiers of the participants, the participation identifiers representing roles of the participants in the online meeting; and determine the picture positions of the participants corresponding to the video pictures in the frame background image based on the participation identifiers.

In some embodiments, the obtaining module 1601 is further configured to:

receive, in response to that the online meeting enables the same-frame mode, a frame background image selection request transmitted by a host client, the frame background image selection request containing the frame background image used by the online meeting; and obtain the frame background image of the online meeting based on the frame background image selection request.

In some embodiments, the apparatus further includes:

a receiving module, configured to receive a position adjustment instruction of the host client on the video pictures in the same-frame picture; and an update module, configured to update the same-frame picture based on the position adjustment instruction, and push an updated same-frame picture to the clients of the participants.

In some embodiments, the apparatus further includes:

a receiving module, configured to receive a setting request for the frame background image, the setting request containing layout parameters of the frame background image; and a storage module, configured to associatively store the layout parameters and the same-frame mode to render the same-frame picture using the frame background image based on the layout parameters.

In some embodiments, the generation module 1602 is further configured to:

obtain participation identifiers of the participants, the participation identifiers representing roles of the participants in the online meeting; and divide the participants into a first object set and a second object set based on the participation identifiers; and display the video pictures of the participants in the first object set in the frame background image, and display the video pictures of the participants in the second object set around the frame background image to generate the same-frame picture.

In some embodiments, the obtaining module 1601 is further configured to:

generate, in response to that the online meeting enables the same-frame mode, a meeting virtual object;

allow the meeting virtual object to join the online meeting; and obtain the frame background image of the online meeting through an object service of the meeting virtual object.

The generation module 1602 is further configured to:

pull the video pictures of the participants through the object service; and generate, by the object service, the same-frame picture based on the frame background image and the video pictures.

In summary, this embodiment provides same-frame mode in an online meeting scene, whereby after a client enables the same-frame mode, video pictures corresponding to participants may be displayed at different positions in a same frame background image, and the frame background image corresponds to a current online meeting. Specific position requirements in different online meeting scenes can be satisfied, and there is no need for the participants to actively adjust display positions of the video pictures corresponding to the participants in an online meeting interface, thereby improving the efficiency of adjusting display requirements of specific positions of the video pictures in the online meeting scene.

Figure 17:
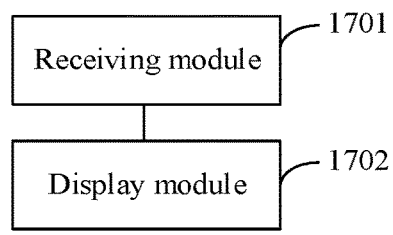
FIG. 17 is a structural block diagram of an online meeting interface display apparatus according to another embodiment of this application.

FIG. 17 is a structural block diagram of an online meeting interface display apparatus according to another embodiment of this application. The apparatus includes:

a receiving module 1701, configured to receive a meeting join operation, the meeting join operation being used for triggering to join an online meeting; and a display module 1702, configured to display a same-frame picture in an online meeting interface in response to that the online meeting enables same-frame mode, video pictures of different participants in the same-frame picture being displayed at different positions of a same frame background image.

The display module 1702 is further configured to display the video picture of the current participant at a picture position of the frame background image in the same-frame picture in response to that video access is enabled.

In some embodiments, the picture position is a position indicated by a video access order in the frame background image, and the video access order is an order in which the current participant enables video access in the online meeting;

or the picture position is a position indicated by a meeting role in the frame background image, and the meeting role is a meeting role of the current participant in the online meeting;

or the picture position is a position set by a meeting host in the online meeting.

In some embodiments, the apparatus further includes:

the receiving module 1701, further configured to receive, in response to that the online meeting enables the same-frame mode, a meeting role setting operation, and determine the meeting role of the current participant; and a transmission module, configured to transmit the meeting role to a server, whereby the server determines, according to the meeting role, the picture position of the current participant corresponding to the video picture in the frame background image.

In some embodiments, the apparatus further includes:

the display module 1702, further configured to display prompt information, the prompt information being used for prompting whether to enable the same-frame mode; and the display module 1702, further configured to:

transmit a layout parameter request to the server in response to a confirmation operation on the prompt information, the layout parameter request being used for requesting layout parameters of the same-frame picture; and receive the layout parameters pushed by the server, and display the same-frame picture in the online meeting interface based on the layout parameters.

In some embodiments, the display module 1702 is further configured to:

upload a video stream of the current participant to the server in response to that the video access is enabled, the video stream containing the video picture of the current participant; and receive the same-frame picture pushed by the server, and display the video picture of the current participant at the picture position of the frame background image, the same-frame picture being generated based on the video picture and the frame background image.

In summary, this embodiment provides same-frame mode in an online meeting scene, whereby after a client enables the same-frame mode, video pictures corresponding to participants may be displayed at different positions in a same frame background image, and the frame background image corresponds to a current online meeting. Specific position requirements in different online meeting scenes can be satisfied, and there is no need for the participants to actively adjust display positions of the video pictures corresponding to the participants in an online meeting interface, thereby improving the efficiency of adjusting display requirements of specific positions of the video pictures in the online meeting scene.

The apparatus provided in the foregoing embodiment is illustrated with an example of division of the foregoing function modules. In practical application, the foregoing functions may be allocated to and completed by different function modules according to requirements. That is, the internal structure of the apparatus is divided into different function modules, to complete all or part of the functions described above. In addition, the apparatus provided in the foregoing embodiment and the method embodiment fall within the same conception. The implementation process is described in detail with reference to the method embodiment and will not be repeated herein.

Figure 18:
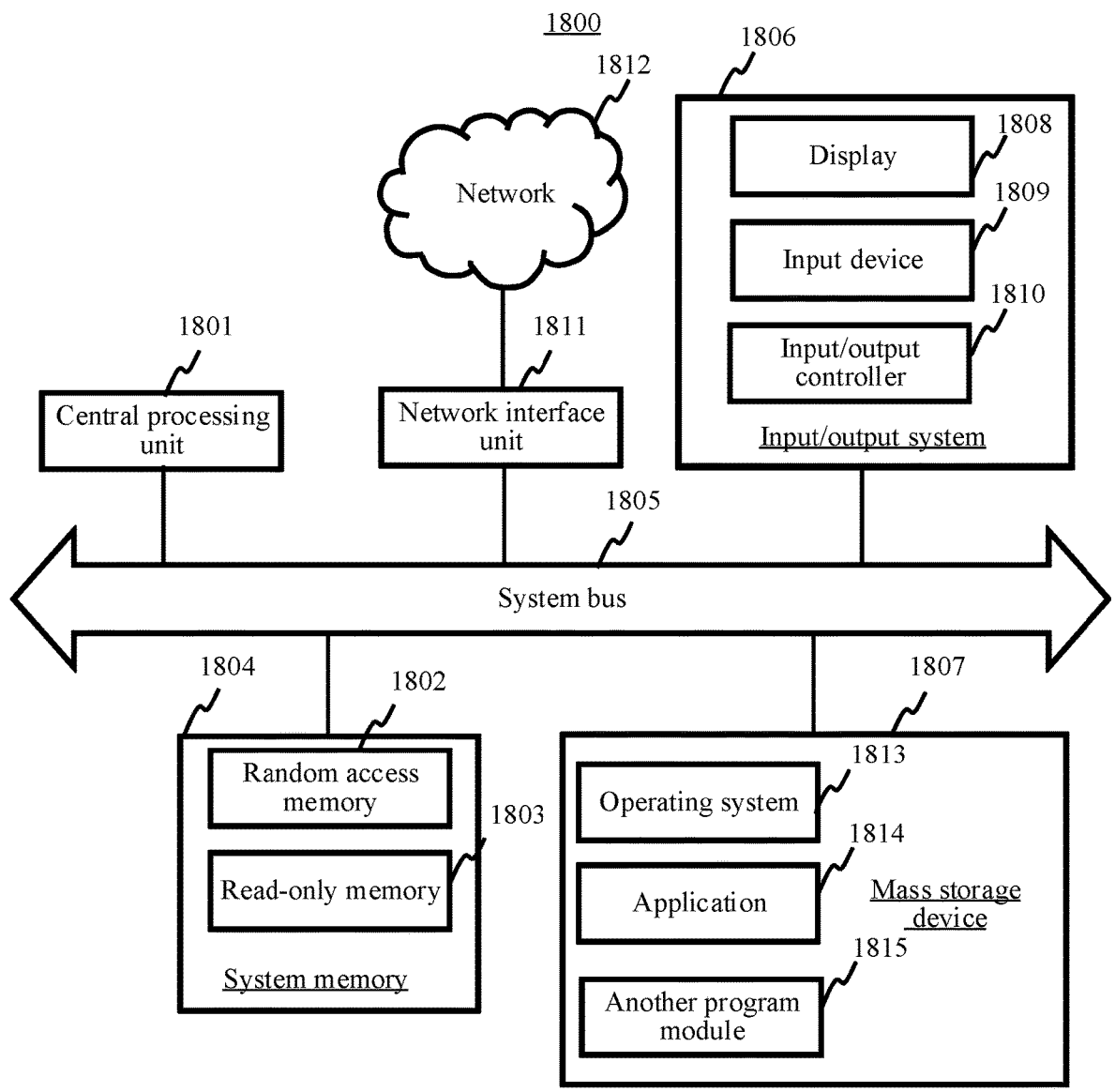
FIG. 18 shows a schematic structural diagram of a computer device according to an embodiment of this application.

FIG. 18 shows a schematic structural diagram of a computer device according to an embodiment of this application. The computer device may be a server or a terminal in the foregoing embodiment. Specifically, the computer device 1800 includes a central processing unit (CPU) 1801, a system memory 1804 including a random access memory (RAM) 1802 and a read-only memory (ROM) 1803, and a system bus 1805 connecting the system memory 1804 and the CPU 1801. The computer device 1800 further includes a basic input/output (I/O) system 1806 that facilitates transfer of information between elements within the computer, and a mass storage device 1807 that stores an operating system 1813, an application 1814, and another program module 1815.

The basic I/O system 1806 includes a display 1808 for displaying information and an input device 1809 such as a mouse or a keyboard for inputting information by a user. The display 1808 and the input device 1809 are connected to the CPU 1801 through an I/O controller 1810 which is connected to the system bus 1805. The basic I/O system 1806 may further include the I/O controller 1810 for receiving and processing input from multiple other devices, such as a keyboard, a mouse, or an electronic stylus. Similarly, the I/O controller 1810 also provides output to a display screen, a printer, or another type of output device.

The mass storage device 1807 is connected to the CPU 1801 through a mass storage controller (not shown) connected to the system bus 1805. The mass storage device 1807 and a computer-readable medium associated therewith provide non-volatile storage for the computer device 1800. That is to say, the mass storage device 1807 may include a computer-readable medium (not shown) such as a hard disk or a drive.

The foregoing system memory 1804 and mass storage device 1807 may be collectively referred to as a memory.

The memory stores one or more programs configured to be executed by the one or more CPUs 1801. The one or more programs contain instructions for implementing the foregoing method. The CPU 1801 executes the one or more programs to implement the online meeting interface display method provided by the various method embodiments described above.

According to the various embodiments of this application, the computer device 1800 may further be connected, through a network such as the Internet, to a remote computer on the network and run. That is, the computer device 1800 may be connected to a network 1812 through a network interface unit 1811 which is connected to the system bus 1805, or may be connected to another type of network or remote computer system (not shown) by using the network interface unit 1811.

This embodiment also provides a computer-readable storage medium. The readable storage medium stores at least one instruction. The at least one instruction is loaded and executed by a processor to implement the online meeting interface display method at a server side or the online meeting interface display method at a terminal side according to the foregoing embodiment.

This embodiment provides a computer program product. The computer program product includes a computer instruction. The computer instruction is stored in a computer-readable storage medium. A processor of a computer device reads the computer instructions from the computer-readable storage medium. The processor executes the computer instructions, whereby the computer device performs the online meeting interface display method according to the foregoing embodiment.

What is claimed is:

1. An online meeting interface display method, performed by a server, the method comprising:
   obtaining a frame background image of the online meeting in a same-frame mode;
   generating a same-frame picture based on the frame background image and video pictures of participants, the video pictures of different participants being displayed at different positions of the frame background image; and
   pushing the same-frame picture to clients of the participants, comprising:
      receiving, from a first client, a layout parameter request requesting layout parameters of the same-frame picture, the layout parameter request being generated in response to an operation on enabling a same-frame mode of the online meeting in the first client; and
      sending the layout parameters of the same-frame picture to the first client to render the same-frame picture based on the layout parameters.

2. The method according to claim 1, wherein the generating a same-frame picture based on the frame background image and video pictures of participants comprises:
   determining picture positions of the participants corresponding to the video pictures in the frame background image; and
   generating the same-frame picture based on the picture positions and the video pictures.

3. The method according to claim 1, wherein the determining picture positions of the participants corresponding to the video pictures in the frame background image comprises:
   obtaining a video access order of the participants, the video access order being a sequence in which the participants enable video access in the online meeting; and
   determining the picture positions of the participants corresponding to the video pictures in the frame background image based on the video access order.

4. The method according to claim 2, wherein the determining picture positions of the participants corresponding to the video pictures in the frame background image comprises:
   obtaining participation identifiers of the participants, the participation identifiers representing roles of the participants in the online meeting; and determining the picture positions of the participants corresponding to the video pictures in the frame background image based on the participation identifiers.

5. The method according to claim 1, wherein the obtaining, in response to that an online meeting enables same-frame mode, a frame background image of the online meeting comprises:
  receiving, in response to that the online meeting enables the same-frame mode, a frame background image selection request transmitted by a host client, the frame background image selection request containing the frame background image used by the online meeting; and
  obtaining the frame background image of the online meeting based on the frame background image selection request.

6. The method according to claim 5, further comprising:
  receiving a position adjustment instruction of the host client on the video pictures in the same-frame picture; and
  updating the same-frame picture based on the position adjustment instruction, and pushing an updated same-frame picture to the clients of the participants.

7. The method according to claim 1, wherein the method further comprises:
  receiving a setting request for the frame background image, the setting request containing the layout parameters of the frame background image; and
  associatively storing the layout parameters and the same-frame mode to render the same-frame picture using the frame background image based on the layout parameters.

8. The method according to claim 1, wherein the generating a same-frame picture based on the frame background image and video pictures of participants comprises:
  obtaining participation identifiers of the participants, the participation identifiers representing roles of the participants in the online meeting;
  dividing the participants into a first object set and a second object set based on the participation identifiers; and
  displaying the video pictures of the participants in the first object set in the frame background image, and displaying the video pictures of the participants in the second object set around the frame background image to generate the same-frame picture.

9. The method according to claim 1, wherein
  the obtaining, in response to that an online meeting enables same-frame mode, a frame background image of the online meeting comprises:
  generating, in response to that the online meeting enables the same-frame mode, a meeting virtual object;
  allowing the meeting virtual object to join the online meeting; and
  obtaining the frame background image of the online meeting through an object service of the meeting virtual object; and
  the generating a same-frame picture based on the frame background image and video pictures of participants comprises:
  pulling the video pictures of the participants through the object service; and
  generating, by the object service, the same-frame picture based on the frame background image and the video pictures.

10. An online meeting interface display method, performed by a terminal, the method comprising:
  receiving a meeting joining operation, the meeting joining operation triggering joining an online meeting;
  transmitting a layout parameter request to the server in response to an operation on enabling a same-frame mode of the online meeting, the layout parameter request requesting layout parameters of a same-frame picture;
  receiving the layout parameters pushed by the server, and displaying the same-frame picture in an online meeting interface based on the layout parameters, video pictures of different participants in the same-frame picture being displayed at different positions of a same frame background image; and
  displaying the video picture of the current participant at a picture position of the frame background image in the same-frame picture in response to that video access is enabled.

11. The method according to claim 10, wherein
  the picture position is a position indicated by a video access order in the frame background image, and the video access order is an order in which the current participant starts video access in the online meeting;
  or
  the picture position is a position indicated by a meeting role in the frame background image, and the meeting role is a meeting role of the current participant in the online meeting;
  or
  the picture position is a position set by a meeting host in the online meeting.

12. The method according to claim 11, further comprising:
  receiving, in response to that the online meeting enables the same-frame mode, a meeting role setting operation, and determining the meeting role of the current participant; and
  transmitting the meeting role to a server, whereby the server determines, according to the meeting role, the picture position of the current participant corresponding to the video picture in the frame background image.

13. The method according to claim 10, wherein the displaying the video picture of the current participant at a picture position of the frame background image in the same-frame picture in response to that video access is enabled comprises:
  uploading a video stream of the current participant to the server in response to that the video access is enabled, the video stream containing the video picture of the current participant; and
  receiving the same-frame picture pushed by the server, and displaying the video picture of the current participant at the picture position of the frame background image, the same-frame picture being generated based on the video picture and the frame background image.

14. A non-transitory computer-readable storage medium, storing at least one instruction, and the at least one instruction being loaded and executed by one or more processors to implement the online meeting interface display method according to claim 10.

15. A non-transitory computer-readable storage medium, storing at least one instruction, and the at least one instruction being loaded and executed by one or more processors to implement:
  obtaining a frame background image of the online meeting in a same-frame mode;
  generating a same-frame picture based on the frame background image and video pictures of participants, the video pictures of different participants being displayed at different positions of the frame background image; and pushing the same-frame picture to clients of the participants, comprising:
receiving, from a first client, a layout parameter request requesting layout parameters of the same-frame picture, the layout parameter request being generated in response to an operation on enabling a same-frame mode of the online meeting in the first client; and
sending the layout parameters of the same-frame picture to the first client to render the same-frame picture based on the layout parameters.

16. The computer-readable storage medium according to claim 15, wherein the generating a same-frame picture based on the frame background image and video pictures of participants comprises:
determining picture positions of the participants corresponding to the video pictures in the frame background image; and
generating the same-frame picture based on the picture positions and the video pictures.

17. The computer-readable storage medium according to claim 15, wherein the determining picture positions of the participants corresponding to the video pictures in the frame background image comprises:
obtaining a video access order of the participants, the video access order being a sequence in which the participants enable video access in the online meeting; and
determining the picture positions of the participants corresponding to the video pictures in the frame background image based on the video access order.

18. The computer-readable storage medium according to claim 16, wherein the determining picture positions of the participants corresponding to the video pictures in the frame background image comprises:
obtaining participation identifiers of the participants, the participation identifiers representing roles of the participants in the online meeting; and
determining the picture positions of the participants corresponding to the video pictures in the frame background image based on the participation identifiers.

19. The computer-readable storage medium according to claim 15, wherein the obtaining, in response to that an online meeting enables same-frame mode, a frame background image of the online meeting comprises:
receiving, in response to that the online meeting enables the same-frame mode, a frame background image selection request transmitted by a host client, the frame background image selection request containing the frame background image used by the online meeting; and
obtaining the frame background image of the online meeting based on the frame background image selection request.

20. The computer-readable storage medium according to claim 19, the method further comprising:
receiving a position adjustment instruction of the host client on the video pictures in the same-frame picture; and
updating the same-frame picture based on the position adjustment instruction, and pushing an updated same-frame picture to the clients of the participants.

* * * * *